United States Patent [19]
Best

[11] Patent Number: 5,636,425
[45] Date of Patent: Jun. 10, 1997

[54] METHOD FOR PROCESSING AND ASSEMBLY OF SMALL PARTS UTILIZING A ROBOT

[76] Inventor: Norman D. Best, 63 Glenflow Ct., Glendale, Calif. 91206

[21] Appl. No.: 620,239

[22] Filed: Mar. 22, 1996

Related U.S. Application Data

[62] Division of Ser. No. 189,118, Jan. 26, 1994, Pat. No. 5,509,191.
[51] Int. Cl.$^6$ ............................................... B23Q 17/00
[52] U.S. Cl. ............................ 29/407.04; 29/407.09; 29/430
[58] Field of Search ..................... 29/407.01, 407.04, 29/407.09, 407.1, 430, 701, 722, 783, 784, 791, 799, 33 J, 35.5, 38 R, 563, 564, 564.1, 650; 414/223; 901/6, 40

[56] References Cited

U.S. PATENT DOCUMENTS

| | | | |
|---|---|---|---|
| 4,163,313 | 8/1979 | Matsuno et al. | 29/563 |
| 4,357,742 | 11/1982 | Fischer et al. | 29/33 J |
| 4,359,815 | 11/1982 | Toyoda . | |
| 4,543,702 | 10/1985 | Wada . | |
| 4,602,417 | 7/1986 | Mesch et al. | 29/564 |
| 4,664,588 | 5/1987 | Newell et al. . | |
| 4,751,361 | 6/1988 | Inoue et al. | 29/564 |
| 4,923,352 | 5/1990 | Tamura et al. | 29/722 |
| 4,987,765 | 1/1991 | Nishimura et al. | 29/33 J |

FOREIGN PATENT DOCUMENTS

| | | | |
|---|---|---|---|
| 76231 | 4/1993 | European Pat. Off. | 29/430 |
| 107760 | 7/1982 | Japan | 29/564 |
| 1657330 | 6/1991 | U.S.S.R. | 29/430 |

*Primary Examiner*—David P. Bryant
*Attorney, Agent, or Firm*—Thomas I. Rozsa; Tony D. Chen

[57] ABSTRACT

A method and apparatus for processing and assembling a plurality of small parts weighing under five pounds using a robot employing a rotatable pallet for holding an array of small parts. Said rotatable pallet being held in place on the robot wrist head, which moves the pallet through a plurality of stationary work-stations located within the operating envelope of the robot, and rotates the pallet at each work-station to index the pallet and to present it to the work-station for an operation on a specific part or parts. Said robot participates in the work-station tasks by moving the rotatable pallet in the X, Y, and Z directions as needed. Movable data pins are used to indicate conditions of individual parts in nests, and of the pallet taken as a whole.

10 Claims, 12 Drawing Sheets

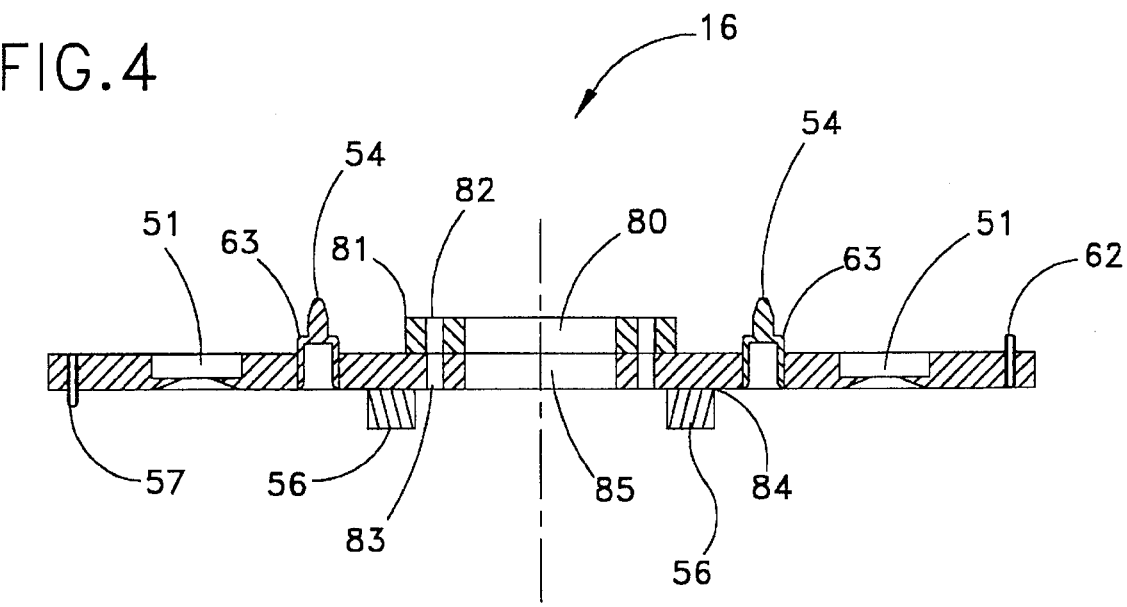

METHOD FOR PROCESSING AND ASSEMBLY OF SMALL PARTS UTILIZING A ROBOT

This application is a divisional of the patent application Ser. No. 08/189,118 filed on Jan. 26, 1994, now U.S. Pat. No. 5,509,191.

BACKGROUND OF THE INVENTION

1. Field of the Invention

The present invention relates to the field of utilizing a robot to process and assemble small devices having small parts or components. More particularly the present invention relates to the field of utilizing a robot with a rotatable wrist to move a rotatable pallet which holds a plurality of small parts, delivering the rotatable pallet sequentially to a plurality of fixed work-stations, moving the pallet to move the part as necessary relative to the station for the station assembly and processing functions, and then rapidly indexing between parts in milliseconds by rotating the pallet. By tracking pallet and nest identity the pallet enables integration of an entire factory information system down to the individual assembly.

As one of the important applications, the present invention method and apparatus will be illustrated in the assembly and processing of intraocular lenses, which are lenses approximately ¼ inch in diameter that are surgically implanted and are difficult to handle due to their small size. They are also particularly susceptible to contamination and damage during human handling.

2. Description of the Prior Art

Cylindrical coordinate and selective compliance articulated robot arm (SCARA) robots now perform many industrial assembly and processing tasks. Primary uses for robots in assembly and processing are those where a specialized operating head is carried by the robot and moved to a fixed part or array of parts, for operations such as painting, welding, and soldering. More commonly, the robot is used as a programmable long-reach pick and place wherein it picks up the component parts from an array of locations and places them in assemblies at other locations. In the electronics industry, robots are commonly used to move components from part feed tubes or vibratory feeders to locations on the surface of printed circuit boards which move on a linear conveyor through the work cell.

In many cases of assembly and processing by robots, the assemblies are delivered to and removed from the robot cell traveling on pallets through or adjacent to the robot. In contrast to the present invention, the robot does not pick up the pallet to perform the operations. Robot productivity is limited by the time-to-index the part pallet, usually two to four seconds, by the distance between the source of components and the point where they are used, usually four inches to several feet, and by the number of tasks that can be accomplished with the particular tool on the robot end effector in the cycle time available. It takes from two seconds to five seconds for a typical robot to perform a complete part pickup cycle, including picking up the part and moving it to the work assembly. Because of the robots' limited work capacity, they are often placed adjacent to pallet transfer lines wherein they accomplish only part of the complete task of assembly or processing along a production line.

These prior art operating modes mimic human motions used in performing similar tasks and have not utilized a significant capability of said robots when they are equipped with rotatable wrists to index between parts in milliseconds.

When a human needs to process parts that are located in various locations, such as at each corner of a room, he would typically use a collection of parts on a tray of a single or multiple rows of parts. He would move to the first station, process all those parts, then move to each successive station until the process or assembly was completed. This invention is a precision tray and precise method for using such tray for moving assemblies that is particularly effective for precision robots equipped with rotating wrists.

A very common way to efficiently assemble or process parts in the millions per year is to provide an indexing central dial with part nests arrayed around it and a series of simple fixed stations each performing a limited assembly, processing, or inspection function. Typical times-to-index parts between stations six inches apart are ⅓ to ½ seconds. Importantly, the nests are at rest in the processing station and the station equipment must supply all of the motions required for the process at that work-station. Such equipment for custom parts is very costly to design and is generally limited to a very specific sequence of operations. When the process changes, such dedicated equipment must frequently be scrapped and a new machine designed. Therefore, from small quantities up to relatively large lot quantities, humans are utilized. However, when the parts are very small, are damaged by human handling, or are damaged by the debris shed by humans, efficient robotic assembly is economical at much lower lot sizes.

Some progress has been made in utilizing robots in small parts assembly, as shown in U.S. Pat. No. 4,543,702 issued to Wada, which discloses a method and apparatus for automatic assembly of lipstick. Wada employs two robots working in conjunction, each operating within the full range of its operating envelope. The first robot is equipped with fingers for clamping molds, and the second is equipped with fingerplates for clamping bottles and holding nozzles. Both robots are movable in three dimensions. Work-stations located around the work profile of the first robot include a mold supply unit, a material charge unit, a cooling unit, and a defective mold unit. The indicated operations are performed at each respective station. The product of the initial operations is then placed on a station from which the second robot can reach it. Work-stations around the work profile of the second robot include a bottle supply unit, a bottle draw-out unit, a stick draw-in unit, and a capping unit, all within the operating envelope of the finger plates and suction holders of the second robot. All these units operating in conjunction provide a fully automatic apparatus for assembling lipsticks and similar cosmetics. Such tooling is intended to always remain in the robot station and it is not assembling and processing small parts in a generic way.

For processing and assembly of small parts, some robots are equipped with multiple tools, either by having an array of tools mounted on the wrist head, or by a tool exchange device. The operating wrist head on the robot can be altered during processing by using a tool exchange device such as the one shown in U.S. Pat. No. 4,359,815 issued to Toyoda which discloses a machining center equipped with a robot arm to change cutting tools in a machining center, and to place a work-piece on this work table and remove it therefrom.

U.S. Pat. No. 4,664,588 issued to Newell discloses a typical mechanism required for a robot to change work tools. The assumption is that for each different task to be accomplished, the robot must be provided with such mechanisms, very expensive specialized robotic tools, space within the cell for storage of all the non-active tools, and must sacrifice time in making the exchange. The present invention changes work-stations instead of tools. However, for some robots, both the present invention and all prior art devices such as specialized tools and tool exchange mechanisms can still be utilized in the same robot work cell and as an integral part of the processing cycle.

Progress is also being made in assisting the robot to carry more than one part in its pick and place function by adding an array of part grippers. At least one manufacturer offers a robot wrist head that uses a circular array of part grippers rotating vertically about a horizontal axis to either present different part grippers or to pick up multiple parts for pick and place operations. Each of the grippers is positively controlled and the operation with the part is performed directly under the wrist head of the robot.

In 1984, Seiko Instruments, a robot manufacturer, disclosed a robot with an end effector having a circular array of four part grippers rotating in the horizontal plane under the robot wrist head. The device permits picking up to four parts from one point for placement in some other location. Because each gripper is expensive and must be individually controlled by the robot, the gripper array normally remains on the robot wrist head during operations and the gripper array has had very limited utility.

Since the mid-1980's robots have not fundamentally progressed in the ways they are used to assemble small parts. However, payloads on some robots suitable for the present invention have increased from 5 pounds to 55 pounds while robot prices have remained essentially the same, declining significantly in real dollar terms. Thus, small parts suitable for the present invention may be assemblies weighing up to perhaps 5 pounds each for which prior art normally installs expensive conveyor systems and multiple robotic cells each doing a small portion of the work.

The above-described prior art does not disclose an apparatus that would permit the convenient and easy assembly of a wide variety of articles having small parts, where tooling for a multitude of processing functions is economical; and that is flexible enough to permit quick and relatively easy changes to assemble completely different articles.

Therefore, there is a need for an automatic robot apparatus that can provide for fully automatic processing and assembly of articles having a number of small parts by much better utilizing the unique capabilities of said robots, increases the number of parts that can be processed or assembled in a given time, and is readily adaptable for production of significantly different articles having short production runs.

SUMMARY OF THE INVENTION

The present invention is a method and apparatus for processing and assembly of small parts utilizing a robot.

It is the primary objective of this invention to increase the speed and efficiency of said robots in processing and assembling components about two to ten times faster than they would be when carrying a single part between operating stations by using mostly standard commercially available hardware and software that is familiar to one skilled in the art.

It is another object of the present invention to more effectively utilize the capabilities of many existing robots by having them move much less while accomplishing much more useful work.

It is another object of the present invention to provide a fully automatic manufacturing cell for assembling articles having small parts, that can be readily adapted to assembly of variable and different articles, making a succession of small production runs economical.

It is another object of the present invention to reduce the complexity and cost of providing a multitude of processing functions within such a robotic work cell.

It is another object of the present invention to provide the means to integrate such robotic production cells within the larger factory process, especially in permitting humans to productively work interactively with said robotic manufacturing cells.

It is another object of the present invention to enable said efficient robotic production to be performed under the clean room conditions commonly associated with pharmaceutical Class 100 sterile filling facilities and semiconductor Class 10 processing with minimal additional costs.

The fully automatic assembling system, according to the present invention, is based on the use of a rotatable pallet which is specifically adapted to hold small parts in circular nest arrays similar to those used on high speed dial assembly machines in dedicated automation processes. The rotatable pallet is temporarily and precisely fixed to the robot wrist by means of dowel pins and cam grippers, or other suitable means. The robot successively presents the rotatable pallet to a plurality of work-stations arranged at the outer periphery of the robot operating envelope, and at each station, rapidly indexes the pallet primarily by rotating its wrist, until all parts have been processed at that station. It then moves to the next station, which may be any of those on its periphery, including returning to a station that was previously used.

According to prior art, such use of the robot to only move parts and assemblies around would not be a good use for the robot. However, it will now be observed that most of those otherwise complex operating stations such as on high speed dedicated indexing dial machines can be much simpler and therefore less costly to build because rather than moving the operating station head, the current invention is to have the robot move the part relative to the station head. That is, rather than install a complex end effector on the moving robot wrist head, an assembly or processing tool is fixed in position and the robot precisely and rapidly moves a pallet of assemblies under it. The use of the robot's controlled motions in the X, Y, and Z directions thus become an integral part of the station's capabilities and greatly simplify its design, reduce its cost and reduce its size so that a wide array of assembly and processing capabilities can be provided in the robotic cell for minor additional costs.

For example, a common station such as a pick and place normally consisting of motion in two axes (X and Z) can be reduced to a single axis (Z) by having the part gripper or vacuum head moving on an air cylinder slide rather than on complex, costly, and large dual direction slides. The gripper would move down to pick the part and then move up, whereupon the robot would move the rotatable pallet outward (from the robot base) under the gripper and then up against the part, the gripper would release the part, and the robot would move the pallet down and inward from the gripper head. A typical pick and place mechanism usually costs about ten to twenty times more than a single axis slide with air cylinder actuator.

A station that would normally be on a single axis slide in a dedicated automation machine such as application of adhesive is simply fixed on brackets in the robot work envelope. The robot moves the pallet under the head and raises the pallet until a part is correctly positioned under the adhesive head. The adhesive is dispensed and the robot rotates the pallet a few degrees, indexing to the next part. If the adhesive or other liquid is to be spread over an area, the robot provides those X, Y, and Z motions at no additional cost or mechanical complexity. Similarly, automatic screw feeders using human-type tools fixed in space can run screws in parts with the robot presenting successive parts and part locations under the operating head. The prior art would mount the screw feeder head on the robot; however, as soon as the screw feeding was completed, the parts would need to be moved to a subsequent station from that robot for the other operations.

For processing stations that would normally require three crossed precision slides to perform their function, the X, Y and Z motions are supplied by the robot. An example of such a station is the lens inspection station described in the preferred embodiment.

Therefore, the cost of providing a multitude of functional capabilities to the robot is dramatically reduced from what would be required to provide end effectors and the change parts tooling for the functions. Further, each such assembly and processing function is available to the rotatable pallet as soon as the robot can move the pallet under the operating head. The cumulative effect of these features is that a single robotic cell might be equipped to process dozens of different processes so that it becomes an economical stand-alone flexible automation factory capable of processing a wide variety of parts through a wide variety of processes for lot sizes of one up to a full pallet of parts. For lot sizes of thousands of parts, multiple rotatable pallets are utilized.

The rotatable pallet has a plurality of part nests disposed in a circular manner, which may be, for example, fifteen degrees of arc each, for retaining a number of parts through use of holes, pins, or other attachable part nest features normally used by persons skilled in the art for such purposes. For suitably small parts, there may be successive concentric nested rings of additional part nests.

The robot moves the rotatable pallet from one work-station to the next, and rotates or indexes the rotatable pallet to present a specific identifiable part to the appropriate work-station.

It is within the scope of this invention to use multi-sided linear arrays of nests to accomplish a high density of part arrays with the nest being periodically rotated to present additional sides of the pallet.

The robot software program stores the pass, fail, and measurement results data for each part in the pallet array. It may then upload the resulting data to a factory network computer when the pallet array is completed. Prior to starting work on the pallet, it receives data from the operator about which processing and assembly program it should run for the particular parts in the pallet array. Such software programming is well understood by persons skilled in the art, and is specific to the robot controller language and commands.

On dedicated, custom assembly machines, part nests on a circular dial are moved perhaps 6 inches in ⅓ to ½ seconds by a barrel cam indexer. With the present invention, a typical robot will move the part approximately one part width plus the clearance between parts in less than ¼ second. Thus, the parts move less distance and more rapidly than in typical dedicated automation machines. Further, the balanced inertia of rotating the disk will be a tiny fraction of the inertia of the arm supporting the disk. The wear on the robot mechanisms and reduction in movement accuracy are directly related to the amount and frequency of the movements required in the processing and to the amount of weight of the end effector. It will be observed that the major movements of the robotic arm are reduced by the ratio of 1 over the number of parts that can be carried on the rotatable pallet. With 24 parts on the pallet, reliability and maintenance costs should be reduced by the same factor. Such costs should be reduced by 96% compared to the prior art.

Persons skilled in the art of dedicated and flexible automation refer to a nest as any opening, device, block of material, or mechanism in which a component rests while moving through an automatic machine, whether active or not. Such nests may be a permanent part of the indexing surface, such as a round hole into which a component rests or a specially shaped hole such as a rectangular hole or any suitable irregular shape. Because the rotatable pallets are relatively inexpensive to fabricate, such simple nests will be frequently employed. Frequently the nests are detachable and changeable by using dowel pins and fasteners. Where many nests may be needed, such as in the present invention, they may be single or multiple cast metal or molded plastic nests that are pressed into or snapped into cavities on the tooling plate. More rarely, it is advantageous for some nests in some processing to include active pins, sides, springs or other devices to retain the parts. The work-pieces can be a work-piece and nest or pallet of the prior art which are then both loaded into a rotatable pallet for processing. The present invention includes all such nests within the scope of what is intended to be installed on the rotatable pallets wherever the term "nests" is utilized.

It is intended that at least one standard form of the rotatable pallet will include a precision screw hole and dowel pin hole at the indicated nest positions suitable for attaching a wide variety of suitable nests for specific parts and specific processing. It is within the intended scope of the present invention that a single rotatable pallet may include a plurality of non-identical nests among which components may be moved for different processing steps while continuing on the pallet. It is within the intended scope of the present invention that such nests may be repositioned or reoriented with respect to the pallet during the processing to facilitate working on faces not readily accessible from the initial positioning. Since small parts processed by suitable robots by rotatable pallets may be devices weighing as much as 5 pounds with complex processing and complex faces, such repositioning for such parts will frequently be necessary.

Since robotic work cells utilizing a rotatable pallet such as are illustrated in the figures, may contain 50 to 100 simple work processing stations, it is within the scope of the present invention that said rotatable pallet may contain a plurality of different components and subassemblies on different nests which are then processed and assembled by the robot in some sequence that results in only one or a few final assemblies on the rotatable pallet.

One of the significant advantages of the present invention is that each such rotatable pallet carries with it the tooling that most facilitates the processing which will be needed for the specific parts to be loaded onto it. Thus, changing the pallet also changes the tooling which the robot has available to it.

A linear array of assemblies on a pallet would be the customary engineering choice because they are easier to design and fabricate. Circular arrays of parts are preferred in the invention because they require the least movement by robot mechanisms to index between adjacent parts, parts can be densely arranged in single or concentric rings on a relatively small disk, the dynamic loads are balanced during rapid motions, and the robot programming to cause indexing between parts using a rotatable wrist is a simple "do loop"

after each rotation command. Often the operating stations will require that the parts be inserted into the throat of the station so that it is advantageous to normally have the part nests on an edge extending out from the robot wrist.

In this manner, the present invention primarily utilizes the rotation wrist of a robot and performs one step in the manufacturing operation on each of the plurality of like parts or subassemblies at each work-station prior to moving to the next work-station. That is, for example, if manufacture of an article requires crimping a part, all the parts on the rotatable pallet will be crimped while the robot presents the rotatable pallet to the crimping work-station by indexing the disk by rotation about its axis. The next step in assembly is performed by the next work-station. When the robot reaches the end of the work-station cycle, all parts on the rotatable pallet, which, for example, may be from about five to about 300 parts, have been completed through that step of the assembly process. This contrasts with present conventional mass production techniques in which a single article is built from start to finish one step at a time.

However, it is within the scope of the method for the robot programming to include adaptive programming whereby under program control and based on the results of such processes as inspection of the part, assembly, or process, the robot performs other corrective operations such as, but not limited to, removal of the defective part, additional attempts to make a successful screw insertion, or positioning of the disk for human intervention in the process.

Where parts must be built in low particulate environments, the presence of humans is a major source of contamination. For example, in normal medical device operations in Class 10,000 conditions, humans must be gowned and wear hairnets and covers on their shoes. For Class 100 sterile pharmaceutical filling rooms, humans must wear face masks and often be in full body closed circulation suits. Humans cannot be present at all in the Class 10 clean rooms needed for semiconductor processing. Current art high density semiconductor microprocessors are built under Class 1 conditions primarily by robotic type devices designed especially for such purposes and the factories cost on the order of $1 billion dollars to build. Reliable robots for operations in Class 1 conditions are now commercially available and are economical to operate using the apparatus and method of the present invention.

An important feature of the present invention is that the pallet permits easy integration by persons skilled in the art of part manufacturing tasks before and after operations in the robotic cell. For example, humans or other automatic stations can load small parts into the pallet at other factory locations and then pass the pallet into the robotic cell for automatic operations. Alternatively, the pallet can be discharged from the cell for additional operations such as final packaging, or the pallet can be set on a stand within the cell for a human to perform remedial operations prior to subsequent processing steps.

The data pins of the present invention are specifically included as an optional feature on the rotatable pallet because humans can set the pins prior to the rotatable pallet entering the robotic work cell so that using a suitable photo sensor and not needing access to a factory computer data base, the robot can modify its operations accordingly. The robot can adjust the data pin positions on the rotatable pallet within the cell so that humans observing the pallet later can receive information without the need to consult a factory computer data base. The same data input and output needs can be utilized by any semi-automatic or automatic machinery processing the rotatable pallet before or after the robot cell by simple photo cells, low voltage electrical, or mechanical switches or other similarly inexpensive means. The data pins can be similarly used between any two processing stations in the factory. Thus, the data pins can dramatically reduce the costs of controlling a process where small lot quantities of highly variable parts are utilized. It is within the scope of the present invention that any suitable number of such data pins can be utilized, such as two per nest or five per pallet condition to indicate the information desired. It is within the scope of this invention that other means of storing processing information on prior art conveyor pallets such as memory chips, radio frequency solid state memories, or other pin memory arrays can also be mounted on the rotatable pallets.

Another important feature of the invention is that by assigning a unique identity to a pallet and by knowing the prior identity of each part inserted into a nest in a particular location on the pallet, processing data on individual small parts can be maintained through a complex manufacturing operation. This feature is particularly desirable when processing critical medical products such as devices and pharmaceutical products manufactured under FDA Good Manufacturing Practices guidelines as will be shown later for one particular product, intraocular lenses.

A significant concern of engineers skilled in the art of machine design is the accuracy of the tooling for which an assembly operation is to be designed. Suitable robots are common today under prior art capable of moving repeatedly to a position within 0.001", and with movement resolutions of 0.0006". Such position accuracy is extraordinarily difficult to maintain when obtained through a succession of machine elements, including the robot, end effector, rotatable pallets, and plurality of nests according to the present invention. For cases requiring highly accurate positions, the invention specifically includes using a vision system observing the work-piece and its supporting nest to find features on said work-pieces and said nests and recording the difference between the intended position and the actual measured position in a data table created or accessible by the robot from which it can add such offsets whenever a highly precise position is needed in the processing. Therefore, even if the nests in the rotatable pallets were mispositioned 0.5 inches from the nominal position on the rotatable pallet, the robot system would obtain and use the necessary position offsets to enable highly precise positioning within the processing work-stations. Some offsets would be repeated every time the rotatable nest would be used and others might depend on precisely and exactly how the rotatable pallet was then held in the robot end effector; however, in all such cases the work-piece could be worked on to the accuracy that the robot could move its wrist head.

The present invention is a significant improvement from the circular horizontal four-gripper array disclosed by Seiko Instruments and is fundamentally different in the scope of the manufacturing tasks it affects. An array of grippers is fundamentally different from a pallet as understood by those skilled in the art. The limited utility of the Seiko disclosed device is apparent because it is not known to be in use anywhere in the world at the present time although it was publicly disclosed ten years ago. The present invention normally includes passive part nests where gravity is the normal restraining force. The nests do not require individual control elements to function. The pallet is particularly suitable for a large array of small parts supported in inexpensive nests. Each pallet array of nests can be different. Nests on the same pallet can be different. Nests are optimized for the operations m be performed. Part identities can be tracked by association with a pallet and nest. The preferred embodiment of a circular pallet with concentric circles of nests permits large numbers of parts to be carried by the robot at the same time. Every pallet change by the robot inherently then equips the robot with the most appropriate tooling for the intended tasks. The rotatable pallet is easily integrated into other automatic stations that do not require the full capability of the robot but only the rotation of the pallet to index between parts. In summary, the four-gripper horizontal rotary array is a way to pick up four parts at a time while the rotatable pallet of the present invention greatly increases the utility of the robot in processing small parts and positively affects factory operations inside and outside the robotic cell.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated:

FIG. 4 is an enlarged partial cross-sectional view of the rotatable circular pallet, taken along line 4—4 in FIG. 2.

FIG. 5 is a perspective view of an alternative embodiment of the present invention showing a rectangular shaped pallet.

DESCRIPTION OF THE PREFERRED EMBODIMENT

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

The detailed embodiment of the present invention will be presented first followed by an illustration of the application of the apparatus and method to one particular small part processing task, manufacture of intraocular lenses; and then other robotic processing embodiments within the scope of the present invention will be shown.

Figure 1:
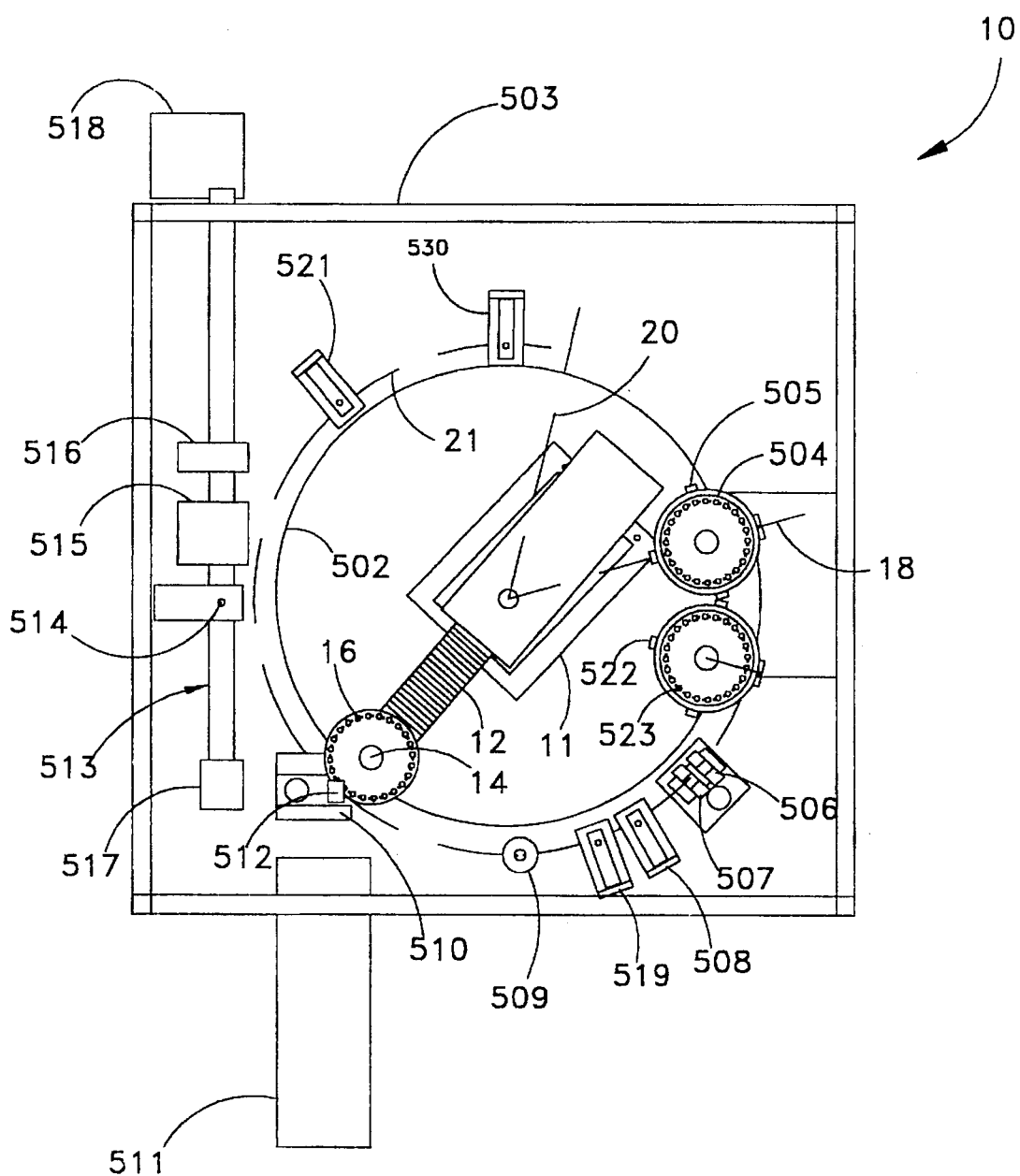
FIG. 1 is a schematic top plan view of an apparatus for small parts assembly utilizing the present invention to process intraocular lenses.

Referring to FIG. 1, there is illustrated an apparatus for small parts assembly 10, including robot 12, which is centrally disposed in the system and may be any acceptable conventional robot, having a rotatable wrist, and capable of accurate movement independently along any of the X, Y, or Z axes, as well as rotation of the robot wrist 14, upon which rotatable pallet 16 is affixed, as described in greater detail below. The limits of operating rotational envelope 21 of robot 12 are shown by the broken lines 18 and 20.

Work-stations 505, 522, 506, 507, 508, 519, 509, 510, 512, 514, 521, and 530 are located sequentially within operating envelope 21 on work table 502, permitting robot 12, securely anchored to pedestal 11, to present rotatable pallet 16 to each illustrative work-station, and to index, by rotation, rotatable pallet 16 to present a specific part to a specific work-station.

The robot rotates through operating envelope 21 in either a counterclockwise, or clockwise direction, and back according to the operational requirements which may be selected for the convenience of the user. Robot 12, for example, may move rotatable pallet 16 through work-stations 507, and 512, in any order, and through other work-stations illustrated, finally depositing rotatable pallet 16 at work-station 522, having performed a certain specified number of operations on each part on rotatable pallet 16, and another robot (not shown) located in a mirror image work cell configuration may then pick up another rotatable pallet 16 from work-station 505, from either the top or the bottom of the magazine, and perform further operations on the parts at work-stations within the operating envelope of the second robot. Alternatively, a self-contained set of operations may be completed by robot 12 on parts located on rotatable pallet 16 by the time robot 12 cycles through the work-stations within operating envelope 21 and a plurality of rotatable pallets 16 may be stacked at work-station 522, for removal by another machine or human operator.

Figure 14:
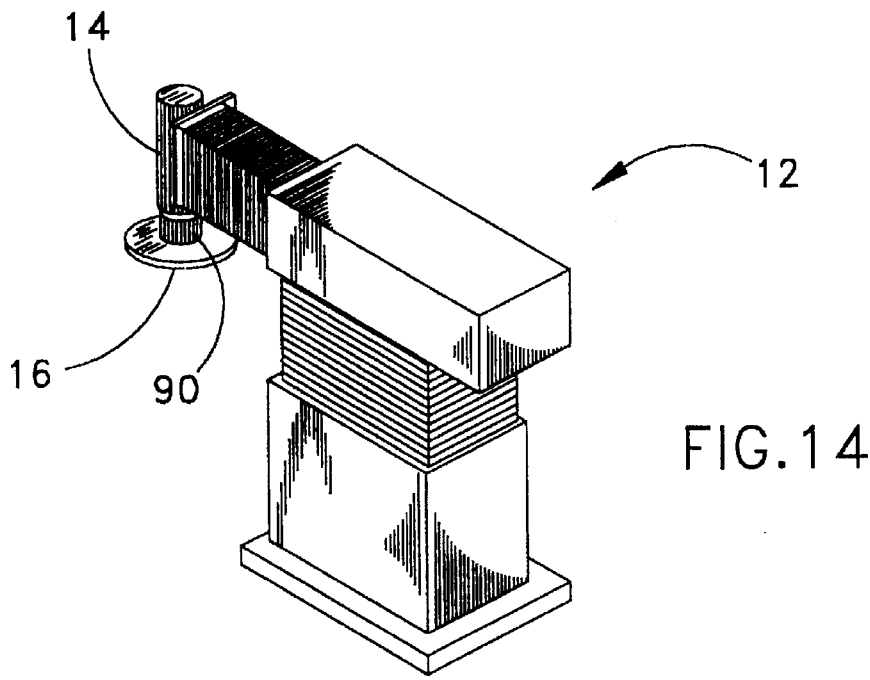
FIG. 14 is a perspective view of a robot holding a pallet below the robot wrist head for normal operations.
Figure 15:
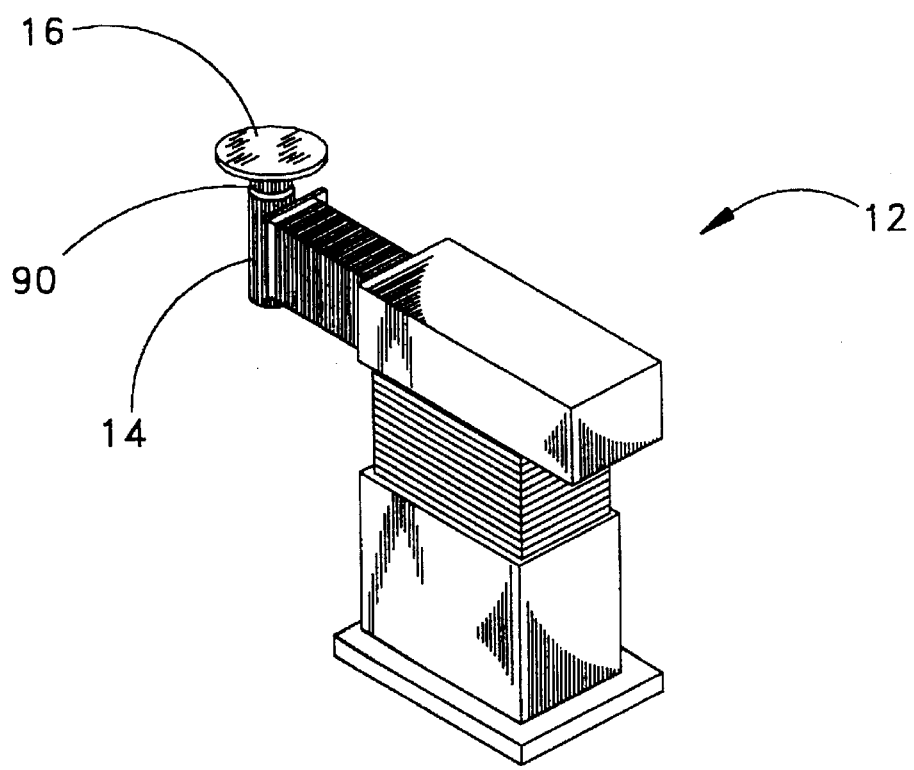
FIG. 15 is a perspective view of the robot holding the pallet above the robot wrist head for clean room operations.

Referring to FIGS. 14 and 15, there are shown the robot wrist 14 with a robot to pallet tool 90 holding a pallet 16 below or above the robot wrist head. Whereas the detailed embodiment primarily presents the invention with the rotatable pallet 16 held above the robot wrist 14 as is advantageous in low particulate processing of parts (as shown in FIG. 15), the apparatus and method work equally well in normal industrial applications where the rotatable pallet 16 is held below the robot wrist 14 (as shown in FIG. 14).

Figure 2:
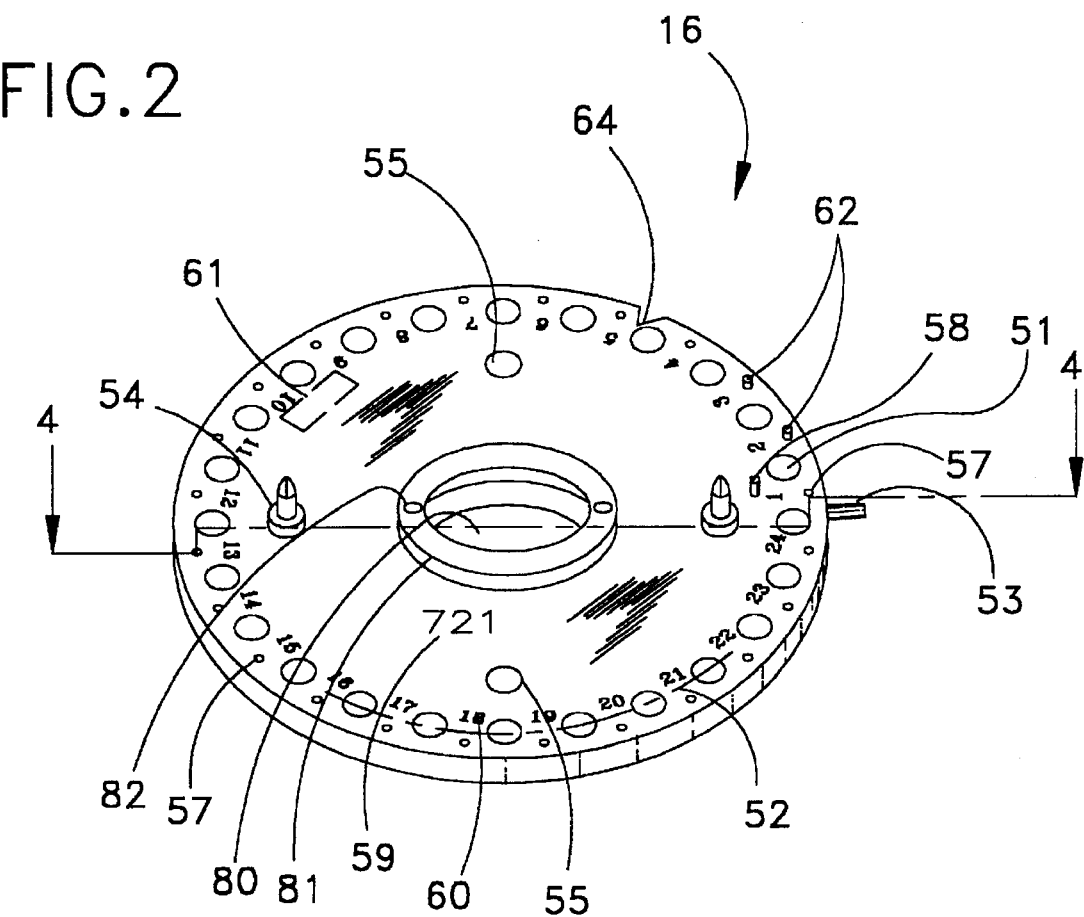
FIG. 2 is a perspective view of a rotatable circular pallet according to the present invention.
Figure 3:
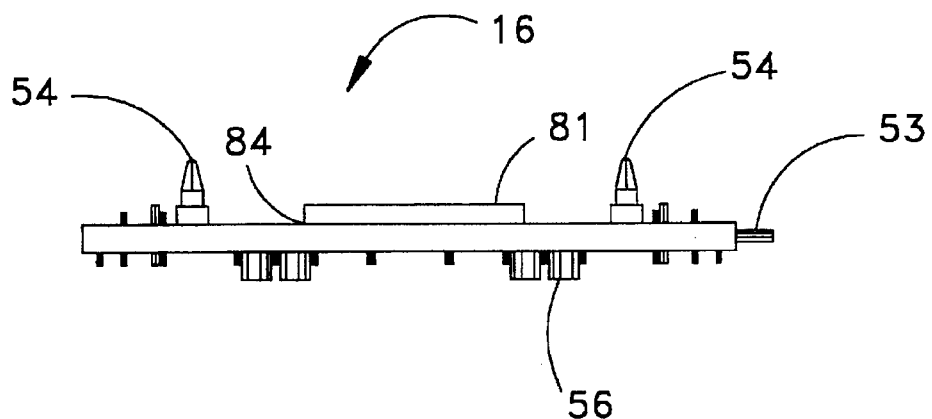
FIG. 3 is an elevation side view of the rotatable circular pallet shown in FIG. 2.

Referring to FIGS. 2 through 4, there are illustrated a rotatable pallet 16, which is a circular disc, which may be from about 7 to about 16 inches in diameter, in accordance with the present invention. Parts may be conveniently held on rotatable pallet 16 in any of a number of part nests 51 arrayed on a circular centerline 52 close to the edge of rotatable pallet 16. Clearly, part nests 51 may be of any design convenient for the parts to be processed including holes of convenient shapes, pins, apertures, or attachable devices such as are commonly used on horizontal rotary dial indexing machines in parts assembling and processing equipment.

The following features are improvements and enhancements of the rotatable pallet 16 but are not necessary for the basic functions of processing and assembling small parts.

Rotatable pallet 16 may include stacking dowel pins 54 which nest with said dowel pins in pallets above or below said pallet when stacked and into which the indexing features of robot to pallet tools are inserted. On one end, the dowel pins 54 have a tapered point and on the other they have a depending cavity. Said dowel pins 54 may be pointed either up or down as necessary to mate with the indexing dowel pins such as 94 (see FIG. 7) on the robot to pallet tool. For some applications such as that illustrated in FIG. 17 where the pallets are not necessarily nested, it may be sufficient that the stacking dowel pins 54 are not used, but their mounting cavities 63 are utilized.

Features such as holes 55 may be included and conveniently located for mechanically gripping the rotatable pallet 16, from the bottom or top.

For rotational orientation in a vertical magazine of such rotatable pallets 16, an orienting pin 53 is inserted in the edge of the pallet near the first nest 51. For other needs, an oftenting notch 64 of any desirable shape might be located in the periphery of rotatable pallet 16.

For human identification of the rotatable pallet and parts in the specific nests, human readable identification numbers such as 721 are affixed to the rotatable pallet 16 as shown by number 59, and adjacent to the part nests 51 as shown by number 60. For machine identification of rotatable pallets 16, bar codes 61 are affixed on the upper and lower surfaces of the disk.

To simplify identification of passing and failing parts on a rotatable pallet 16, data pins 57 may be provided adjacent to part nests 51. These data pins 57 may be standard spiral expanding pins approximately ½ inch longer than the thickness of rotatable pallet 16, or similar devices retained primarily by friction between the rotatable pallet 16 material and the pins 57. When pushed down flush with the upper surface of the rotatable pallet 16, they indicate that the part in the adjacent nest 51 is acceptable. When a data pin 57 is pushed up flush with the lower surface of the rotatable pallet 16, such as data pins 62, the position indicates that the part is defective. For operator convenience, an additional data pin 58, of identical design to 57, is provided to indicate whether any nest 51 in the rotatable pallet 16 contains a defective part. Said data pins 57 and 58 may be in the up or down position to indicate a pass based on convenience to the user. Further, an intermediate point in the pin travel could be used to indicate a plurality of operating states.

Data pins 57 may conveniently be laid out in a circle along with pallet data pin 58 as illustrated in FIG. 2, enabling a single stationary detector, such as a photo diode pair or laser edge detector, to detect the presence or absence of the quality assurance pin below rotatable pallet 16 in any specific sector where work is being performed. Alternatively, at the completion of inspection of all parts on the disk after one step of the manufacturing process, rotatable disc 16 can be indexed through its entire 360 degrees of rotation to permit the detector to read the presence or absence of data pins 57 and 58 in the up position.

Data pins 57 and 58 may be set by the robot moving the pallet against a fixed pin (not shown) somewhat larger than data pins 57 and 58 where it contacts one end of the data pins 57 and 58. To set the data pins 57 and 58 down, the pallet is moved up against an overhead pin. To set the data pins 57 and 58 up, the pallet is moved down against a pin under the pallet. Clearly, the user can choose for the data pins 57 and 58 to indicate pass and fail conditions, or any other conditions that may be convenient. Further, the user may wish no data pins 57 and 58, or may desire additional pins for particular reasons. For example, the last numbered nest 51 could be omitted and that space on rotatable pallet could contain a closely spaced array of a plurality of additional data pins 58 for indicating the overall pallet condition on the same circular line (not explicitly shown) as the nest data pins. If such a closely spaced array of data pins 58 were fixed to the rotatable pallet 16, they could indicate the pallet identification using the pins 57 reading device, omitting the need for a separate bar code reader for codes 61.

When data pins 57 and 58 are present and stacking is desirable, it is then necessary to provide vertical separation between rotatable pallets 16. In such cases, stacking pins 54 are extended a suitable length downward (or upwards) to prevent the lower rotatable pallet 16 from raising the data pins 57 and 58 in the rotatable pallet above it, and to permit setting the rotatable pallet 16 down on a surface without affecting the data pins 57 and 58. Stacking spacers 56 can be affixed to the bottom surface of pallet 16 by adhesive 84 at convenient locations.

Rotatable pallet 16 may be made from any convenient material and by any method, that provides rigidity, good stability and tolerances, and light weight such as aluminum, or an engineering plastic. They may be machined, cast, or molded as convenient to the user.

In FIGS. 2, 3, and 4, there is also illustrated that a tool change ring 81 may be affixed in the center of rotatable pallet 16. The ring 81 is compatible with the tool exchange tools commonly affixed to robot wrists 14 for that purpose; however, no electrical or pneumatic connections are necessarily made to the rotatable pallet 16. Referring to FIG. 4, the tool change ring 81 consists of an annular ring with a central clearance hole 80 and two dowel pin clearance holes 82 to match the dowel pins on the commercial robot tool change head. A clearance hole 85 matching that of the clearance hole 80 is provided in the center of the pallet 16. Two dowel pin holes 83 are provided in the rotatable pallet to match the dowel pin holes 82 in the tool change ring 81. The annular ring may be integral to the rotatable pallet at manufacture, or may be attached by adhesive 84 or similar standard high strength fastening techniques.

Figure 6:
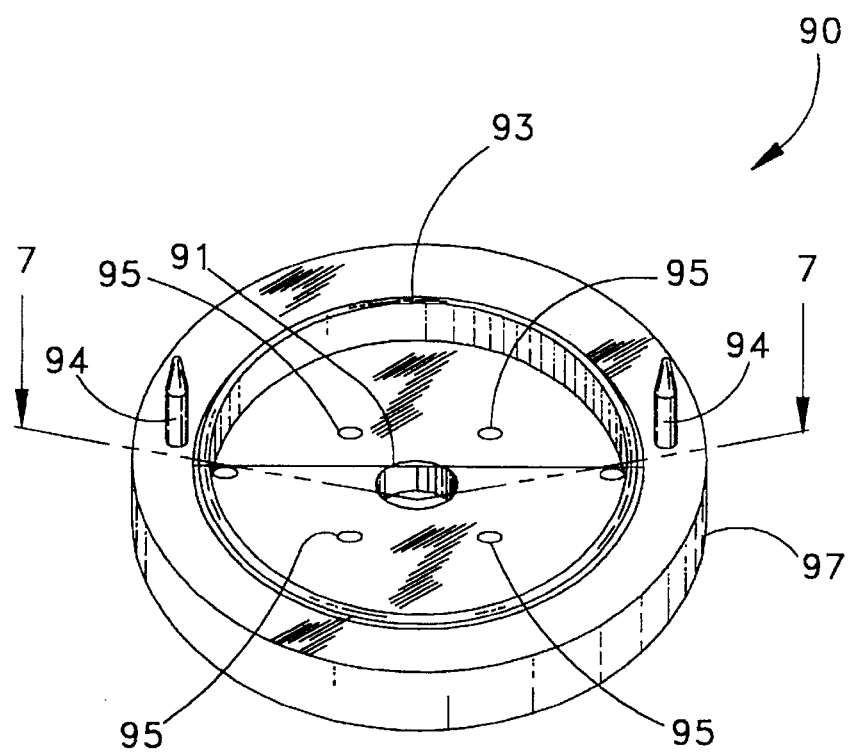
FIG. 6 is a perspective view of robot to pallet tool based on vacuum for using the embodiments of a rotatable pallet according to the present invention.

A suitable commercial robot tool change head would be that according to U.S. Pat. No. 4,664,588 issued to Newell. Referring to said patent FIG. 1, assembly 17 is affixed to the robot wrist head and the clamps 38, bosses 19, and flange 18 would penetrate the central cavities 80 and 85 of the present invention. Referring to FIGS. 3 and 6 of said patent, the clamping arms 38 normally close against steel pins 54. In the present invention, the clamping arms would close on the far side of the pallet 16 at the edge of cavity 85. The said Newell invention utilizes two arms 38; however, it could be sufficient to use a single arm 38 for said clamping.

Integrating standard robotic tool exchange heads and other similar units provides the benefit that the robot 12 can then not only use the apparatus and method of the present invention, but can also function at least part of the time in the robotic mode of the prior art as a pick-and-place mechanism.

Referring to FIG. 5, there is illustrated a non-circular rotatable pallet 70 which has a plurality of sides, along each of which are disposed nests 51 along linear centerlines 71. All other features presented heretofore describing circular rotatable pallet 16 are similarly disposed and identified. The stacking dowel pins 54 are shown or the holes 63 could be utilized instead. Noting in particular that a circle is simply a shape with an infinite number of sides, it is within the scope of the present invention of apparatus and method that when such features are located on more than one side of rotatable pallet 16, it requires periodic rotation of the robot wrist 14 for presentation of additional nests 51 to the work-stations. Such linear rotatable pallets 70 are more difficult to usefully integrate with closely spaced robotic work-stations and cannot as easily be automated in other factory operations as the circular rotatable pallets 16.

Figure 7:
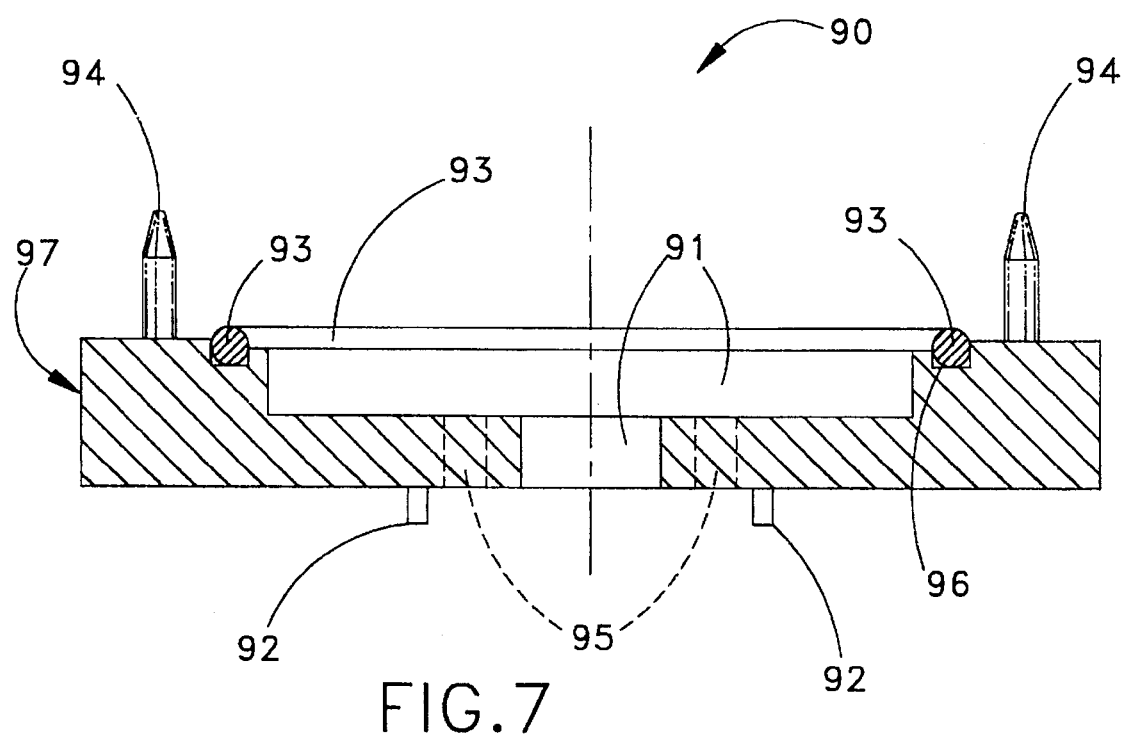
FIG. 7 is an enlarged partial cross-sectional view of the rotatable circular pallet, taken along line 7—7 in FIG. 6.

Referring to FIGS. 6 and 7, there are illustrated a simple tool for attachment to a standard robot wrist head 14 for handling of rotatable pallets 16 where the gripping function is supplied by applying a negative pressure. The robot to disk vacuum tool 90 consists of a body 97 with central cavity 91 connecting the central air port on the end robot wrist 14 to that cavity. The robot air port will supply a negative pressure on command. The cavity is sealed by means of an O-ring 93 and O-ring cavity 96 when the tool 90 is pressed against the rotatable pallet 16. Four holes 95 are provided for bolting to the robot wrist head 14. Two tooling pins 92 in the tool 90 mate with holes in the robot wrist head 14 for precision alignment. Two chamfered dowel pins 94 mate to the stacking dowel pins 54 or holes 63 in rotatable pallet 16. Features may be changed in location and size to suit other robots such as those illustrated later in FIGS. 16 and 17. For larger pallets as will be presented later, the dowel pins 94 would be positioned on arms extending further away from the central body 97 as shown later in FIG. 17. Clearly, when using the vacuum tool 90, the central area of pallet 16 cannot contain the annular ring 81 or the cavities 80 and 83.

Figure 8:
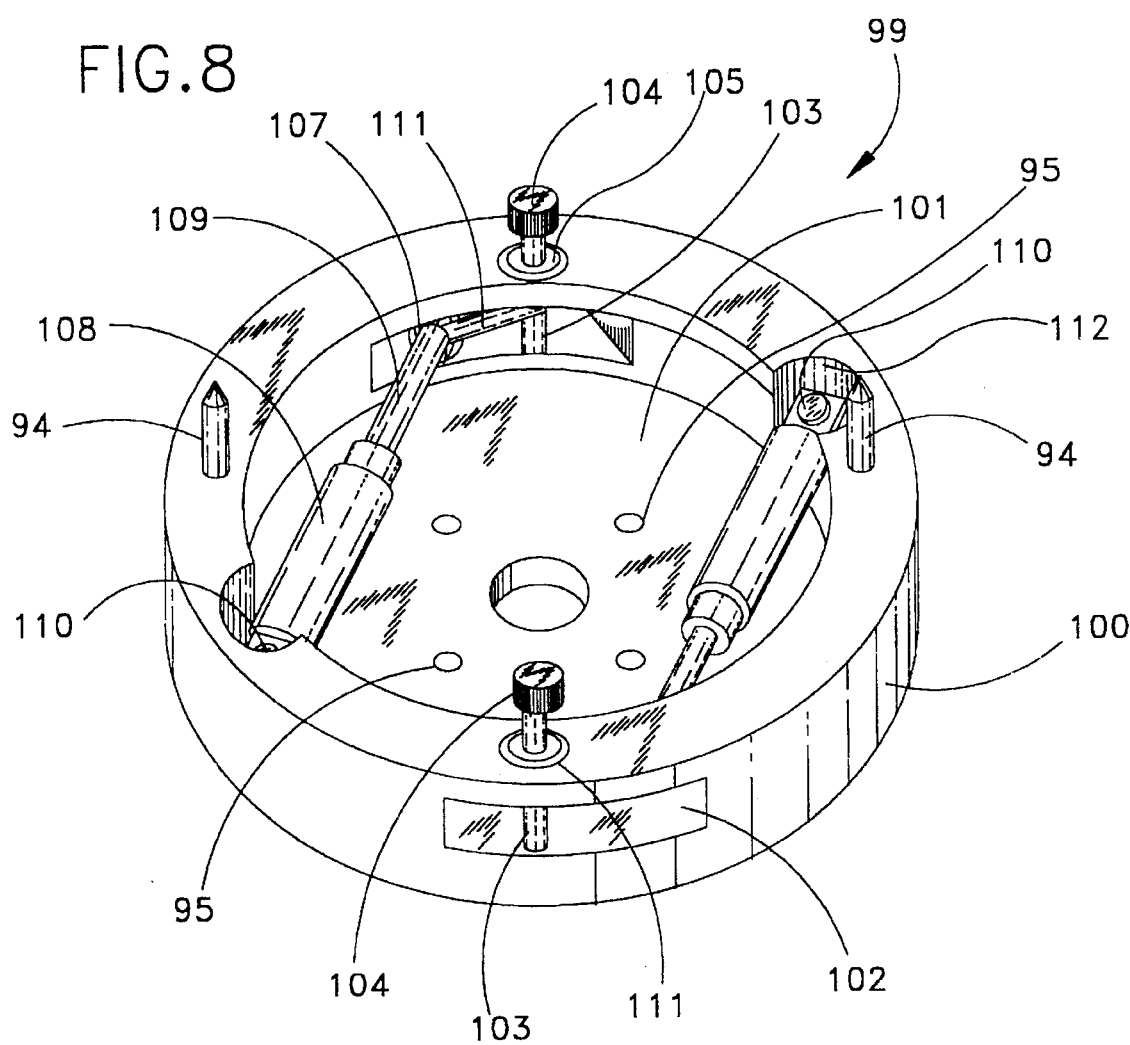
FIG. 8 is a perspective view of a robot to pallet tool based on mechanical gripping of a rotatable pallet according to the present invention.
Figure 9:
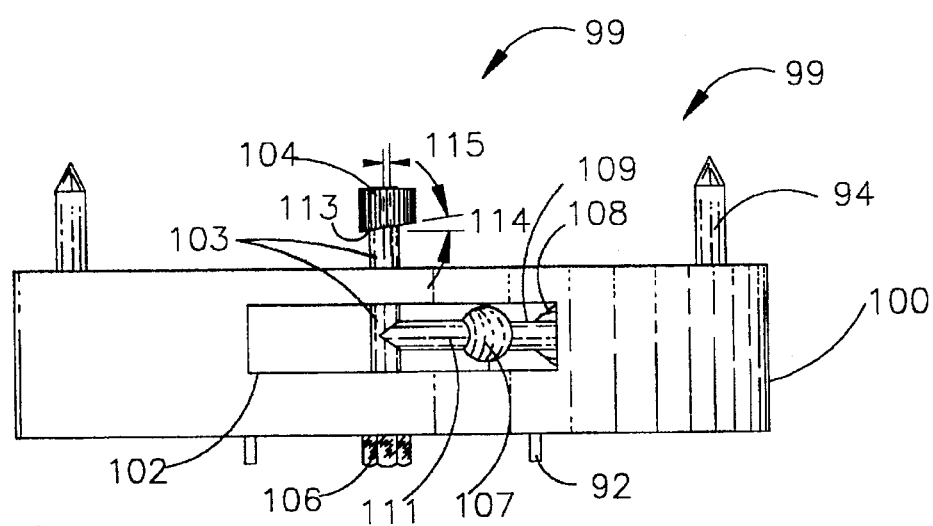
FIG. 9 is an frontal view of the apparatus in FIG. 8. For clarity in the figure, the components of the cam gripper assembly on the left in FIG. 8 have been omitted.

Referring to FIGS. 8 and 9, there is illustrated a tool 99 for attachment to the standard robot wrist head 14 for handling of rotatable pallets 16 where the gripping function is supplied by pneumatic air cylinders 108 acting through lever arms 111 on clamping cams 104. The gripper body 100 has a central cavity 101 with two side clearance holes 102 for mechanisms. On the upper surface, two dowel pins 94 mate with the stacking dowel pins 54 on rotatable pallet 16. Four bolt holes 95 are provided for bolting to the robot wrist head 14. Two dowel pins 92 mate to dowel pin holes on the robot wrist head 14.

Prior to mating to rotatable pallet 16, the two gripper cam shafts 103 are rotated clockwise (as viewed in FIG. 8) so that their eccentrically mounted gripper lobes 104 are aligned with the cam gripper holes 55 in rotatable pallet 16. The centerlines of the gripper lobes 104 vary from the centerlines of cam shafts 103 by distance 115. After mating, the gripper cam shafts 103 are rotated counterclockwise by tension from the air cylinders 108 acting through gripper cam arms 111, ball joints 107, and extension shafts 109. Air cylinders 108 are secured by and pivot about bolts 110 in cavity 112 in the wall of the gripper tool body 100. The gripper cam shafts 103 are secured at the lower end by nuts 106 and at the upper end by retaining clips 105 recessed in cavity 111 in body 100. The lower surfaces 113 of cam lobes 104 then in contact with the upper surface of rotatable pallet 16 are machined at a slight angle 114 so that as they rotate about cam shafts 103, they clamp the rotatable pallet 16 against the robot to pallet gripper tool 99 with increasing force. When the air cylinders 108 can no longer rotate the cam arms 111, the rotatable pallet 16 is securely gripped.

Figure 10:
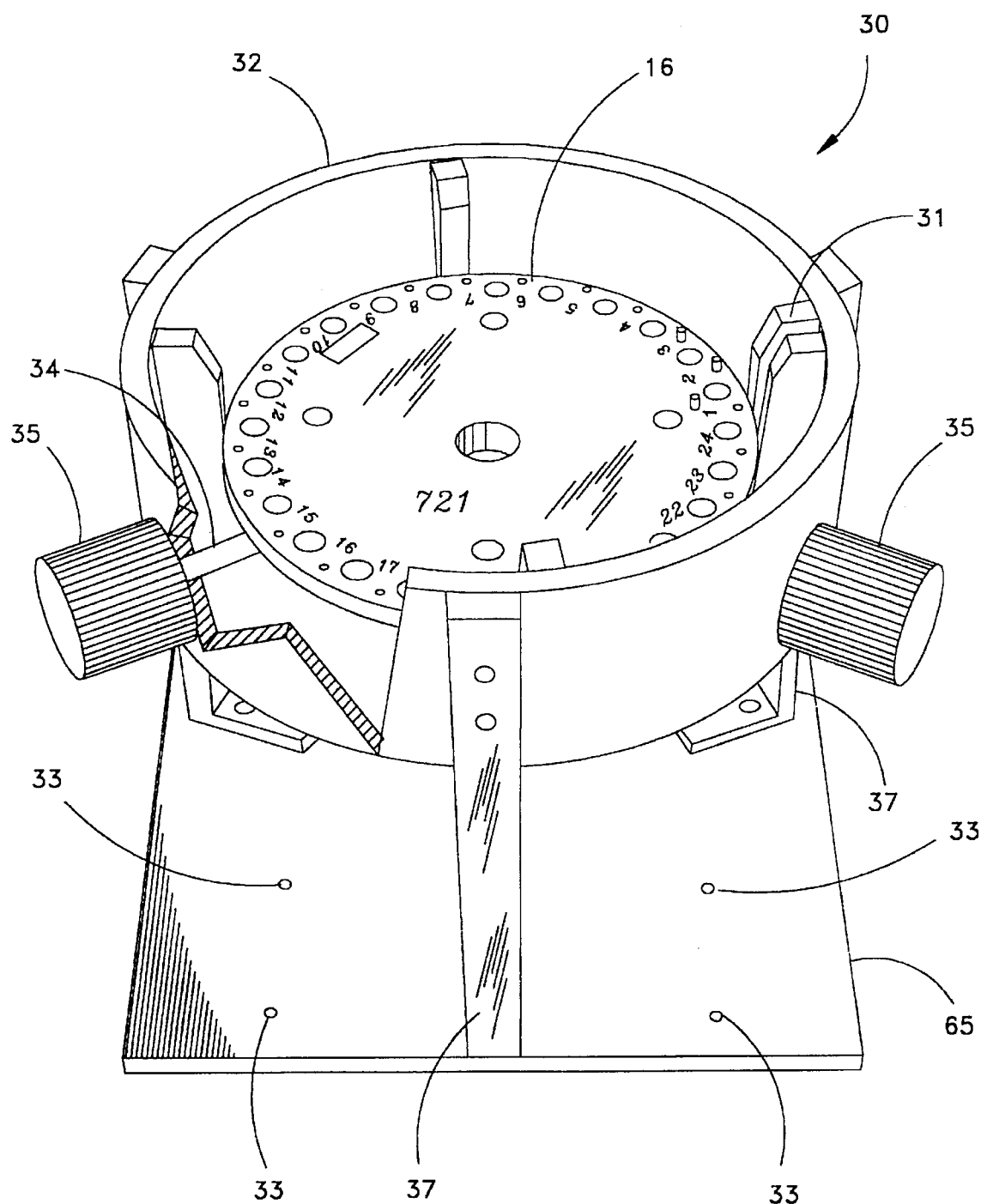
FIG. 10 is a perspective view of a magazine for receiving, storing, and dispensing a rotatable pallet in a robotic work cell according to the present invention.
Figure 11A:
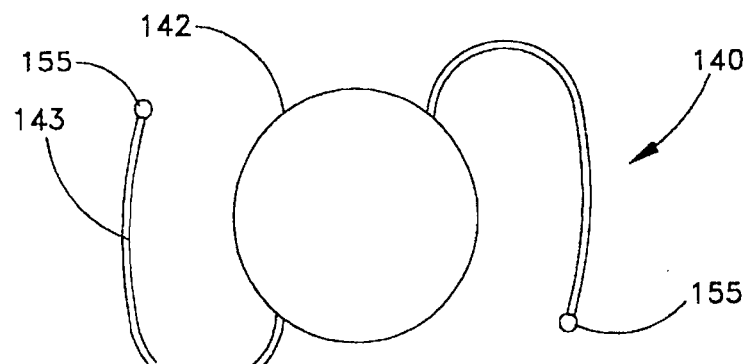
FIG. 11a is a top plan view of a three-piece intraocular lens for assembling and processing with the apparatus and method according to the present invention.
Figure 11B:
FIG. 11b is a side elevation view of a three piece intraocular lens for assembly and processing with the apparatus and method according to the present invention.
Figure 12A:
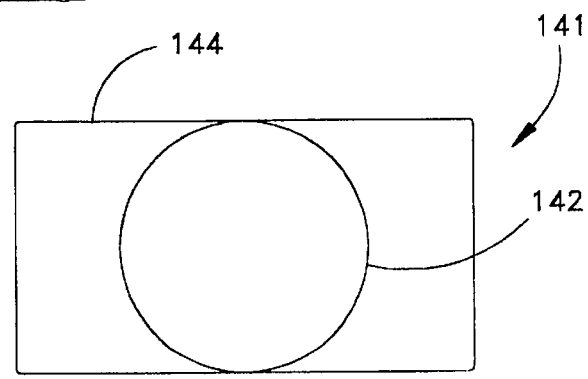
FIG. 12a is a top plan view of a one-piece intraocular lens for assembling and processing with the apparatus and method according to the present invention.
Figure 12B:
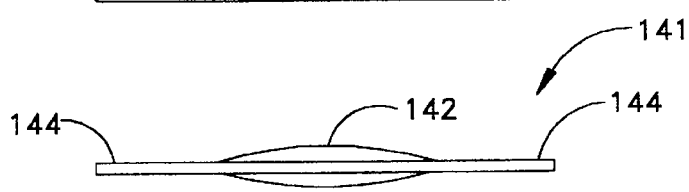
FIG. 12b is a side elevation view of a one piece intraocular lens for assembling and processing with the apparatus and method according to the present invention.

Referring again to FIGS. 1 and 2, work-station 505 may be rotatable pallet 16 dispensing magazine 30, as illustrated in FIG. 10, consisting of a tubular magazine 32, having a plurality of vertically stacked rotatable pallets 16 of which only the bottom one is shown, which nest upon each other in the manner described in more detail below, and at least three retractable pins 34 moved by pneumatic cylinders 35 located in a plane at the bottom of pallet dispensing magazine 30, around the circumference thereof at equal intervals, which may be simultaneously retracted by application of air pressure, for a period long enough to permit one rotatable pallet 16 to be presented to robot wrist head 14 by a combination of gravity and suction provided by vacuum head 90 of robot wrist head 14. The tubular magazine 32 is held above the working cell of the robot cell 10 by a plurality of support brackets 37 attached to mounting plate 65 which is attached by bolts (not shown) through holes 33 into work table 502. A plurality of guide blocks 31 chamfered at the top and bottom and affixed to the interior of tubular magazine 32 precisely guide the rotatable pallets 16 vertically. Two guide blocks are closely spaced, providing a guide for the rotational orientation pin 53 shown in FIG. 2. When using a notch 64, instead of pin 53 on pallet 16 as shown in FIG. 2, the guide blocks 31 would have a depending protruding surface so that only one orientation of the rotatable pallet 16 would enable passage through the tubular magazine 30.

The robot wrist head 14 grips the central portion of rotatable pallet 16, which itself is aligned to robot wrist head 14 by locator pins 94, which mate with locator pins 54 or holes 63 in rotatable pallet 16, for insuring proper alignment of pallet 16 on robot wrist head 14. It is important that locator pins 94 and respective depending stacking pins 54, or holes 63, are near the periphery of circular rotatable pallet 16, thereby providing an accurate basis for locating nests 51 in rotatable pallet 16. Vacuum head 90 applies a negative pressure to the bottom of the rotatable pallet 16, from negative pressure supplied through the robot pneumatics by means of specific hardware well known to those skilled in the art.

It is apparent that the pallet dispensing magazine 30 may also be used in reverse as a pallet storage magazine, into which a plurality of rotatable pallets 16 may be vertically stacked from the bottom to raise the pallet stack, advantageously after completion of a series of operations on the parts located on rotatable pallet 16.

Referring again to FIG. 1, pallet dispensing and receiving magazines 30 can be disposed at work-station 505 and 522 respectively, providing a source stack 504 of parts-loaded rotatable pallets 16 to robot 12, and after completion of all steps that can be performed at the work-stations within operating envelope 21, rotatable pallets 16 with the finished parts on them are then stacked into a pallet receiving magazine 522 identical to that shown in FIG. 10 in a stack 523 of said rotatable pallets.

The processing and assembly of intraocular lenses illustrates the utility of the primary apparatus and methods of this invention. All the following inspection and processing work is normally performed by humans working with tweezers under relatively high power microscopes and normally takes many minutes. By using the invention of a rotatable pallet 16 carrying an array of parts mounted on a robot wrist head 14, processing time may be as short as 10 seconds per lens and may be done in class 10 clean room conditions. For such clean room processing, the roof 503 of the robotic work cell 10 would be a laminar flow HEPA filter air source as understood by persons skilled in the art of clean room design.

Intraocular lenses have several properties that make them particularly appropriate for illustrating the present invention: they are physically tiny devices, they are easily damaged by humans in handling and most particularly by shedding dirt particles on them, the dirt particles are specifically inspected for and can be causes to reject the lens, the lenses are difficult to clean, and under the United States Food and Drug Administration Good Manufacturing Practices, production data must be kept on each serial numbered lens and that data gathering begins with the material and specific mold the lens was made in. The present invention permits processing in the cleanest possible circumstances in modern medical device processing, it is carried out with full traceability of all manufacturing process data and results on each serial numbered lens, it can be started and completed within five minutes of when the last lens is loaded into a rotatable pallet 16, and includes fully automatic inspection and processing to exacting, repeatable, consistent standards. Finally, the lens can be fully processed in a single robotic cell and placed into a final particulate protected package before it is reintroduced to the surrounding class 10,000 work environment. In most other cases, some but not all of the above manufacturing conditions are present; therefore, intraocular lens manufacturing is particularly useful to understand the apparatus, methods, and benefits of the present invention. However, the specific apparatus and specific methods of processing of intraocular lenses are not the subject of the current invention and are not therefore presented in detail.

Referring to FIGS. 11a, 11b, 12a and 12b there are illustrated two common types of intraocular lenses. Shown in FIGS. 11a in a plan view and in 11b in an elevation view is a traditional three-piece lens 140 consisting of a central molded optically clear double convex lens 142 and two curved haptic filaments 143 which support the lens after it is surgically inserted into a patient's eye. Shown in FIGS. 12A in a plan view and in 12B in an elevation view is a single-piece lens 141 consisting of essentially the same double convex lens 142 with two thin flat molded haptics 144 molded integrally with the lens and disposed left and right of the convex lens 142. For scale, the outside diameter of double convex lens 142 is less than ¼ inch, so the device is tiny and difficult to handle by humans.

Figure 13:
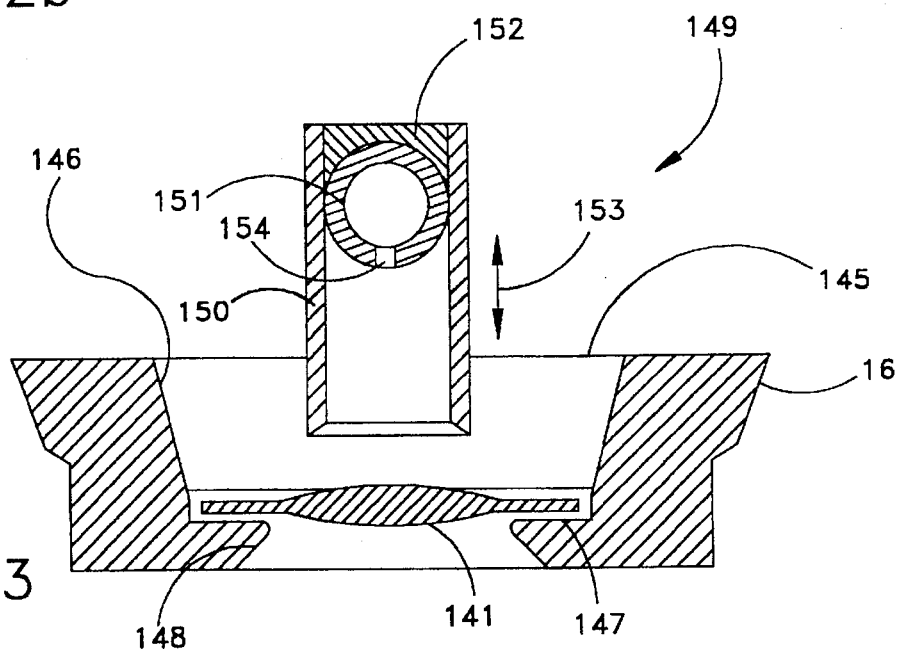
FIG. 13 is a cross-sectional view of a nest in a rotatable pallet suitable for processing intraocular lenses and illustrating a vacuum tool particularly suitable for handling of such intraocular lenses according to the present invention.

Referring to FIG. 13 there is illustrated one suitable part nest 145 for handling such devices in rotatable pallet 16 with a plurality of nests 51. The top cavity 146 in the lens nest is an inverted frustum leading down to a ledge 147 on which the lens 141 rests by its haptic arms 144. A lower cavity 148 is also a frustum to let the maximum amount of light come up through cavity 148 during inspection by vision inspection cameras mounted over rotatable pallet 16 in certain workstations.

Also illustrated in FIG. 13 for clarity of usage is a lens movement tool 149 used for repositioning the lens during certain inspections. The tool is fixed to a surface (not shown) not moving with the robot wrist head while the pallet 16 is moved vertically in directions 153 by the robot 12. A short soft vacuum tubing tip 150 contacts the double convex lens 142 at its outer periphery. Vacuum is supplied to tip 150 by a horizontal hollow tube 151 through hole 154. Tubes 150 and 151 are sealed together by sealant 152. To remove a lens 141 from the nest 145, the robot moves the rotatable pallet 16 nest 145 under the tool 149 and then raises the rotatable pallet 16 until the lens 141 is contacted by the tool tip 150. A slight negative pressure is supplied through tube 151 causing tip 150 to grip the lens 141. The robot then lowers the rotatable pallet 16, causing the lens 141 to be lifted out of the nest with the haptics 144 exposed. This operation occurs under the first inspection video camera and is used to check the haptics for damage and particulate. If no damage or particulate are noted, the robot 12 returns the lens to its nest by reinserting the rotating pallet 16 under the lens 141 and then moving it gently upward until the lens is seated back in nest 145. The negative pressure in tube 150 is then changed to a very low positive pressure ensuring that the lens 141 leaves the tool tip 150. The tool 149 is supported by a horizontal slide (not shown) so that it can be moved laterally into and out of the inspection area, and can be used among a plurality side-by-side stations. Thus, as soon as the robot 12 has positioned the lens back into the nest 145 and the pallet 16 has been lowered, the lens movement tool 149 may be moved laterally so that inspection of the central convex lens 142 while residing in nest 145 can commence.

The robot 12 then moves the rotatable pallet 16 down and rotates the pallet 16 fifteen degrees to present the next lens for inspection.

This operation description illustrates how the apparatus and method enables the robot to perform functions that would be difficult and costly to design and engineer by moving apparatus other than a rotatable pallet 16 on a robot wrist head 14.

Referring again to FIG. 1 where the full robotic cell 10 for processing and assembling lenses is depicted, rotatable pallets 16 have previously had intraocular lenses placed in them at the de-molding station by an operator who also entered the identity and processing data for each lens in a central computer data bank. As soon as a disk is filled, which may be a single lens or all 24 lenses, the operator loads it onto the top of the input magazine stack.

Normally the robot 12 has completed all prior tasks and is waiting for more pallets 16. The robot moves under the input magazine stack 505, lifts and grips the rotatable pallet, lowers and begins processing the pallet 16. The robot 12 then moves the rotatable pallet 16 under a conveniently positioned bar code reader to determine the identity of the pallet 16. The robot 12 may then download data from the data base computer to determine identity and processing requirements for each lens 140 in the pallet 16. The robot 12 may also access an internal data base of routines by product type to determine the specifications of each part and load that data into a spreadsheet-type data array in its program to guide the processing and to set the processing and inspection parameters for each lens 140 or 141 contained in the specific rotatable pallet 16.

The robot 12 then begins the processing by moving to the vision inspection station 506, where a low magnification vision camera makes measurements and assesses defects. This process includes removing the lens 140 or 141 from the nest 145 and inspecting the haptics 143 or 144 for defects and particulate. The central convex lens 142 is then inspected. When defects are noted that require a high magnification vision camera, the robot 12 stores the defect type and the location of each defect relative to the current position in its computer data base.

The robot 12 then moves to the high magnification station 507 where each lens is sequentially presented and then each defect within that lens is evaluated. This station may include a pair of small deionized air blow-off tubes (not shown) positioned above and below the nest 51. When all defects and particles on a lens have been inspected, the robot 12 may then pass that lens 140 or 141 between the blow-off tubes in a useful pattern of movement and then return to the high magnificat/on cameras to see if the particles moved. If so, the lens may be acceptable. If not, then the robot 12 might conveniently move to set the data pin 57 for that nest to reject and the data pin 58 for the pallet test results to reject also.

The robot would continue inspecting and cleaning lenses. Occasionally, it may find a lens mis-oriented so that it cannot get an accurate measurement. The robot 12 then moves the pallet 16 over the lens orienter station 509. Acting through a vacuum probe similar to the lens movement tool 149 but positioned below the lens, this station rotates the mis-oriented lenses into an inspectable position.

One of the defects inspected for is excess flash at the mold part lines. One suitably precise method for removing the flash is a laser. If such defective flash is detected in the high magnification station 507, then the robot 12 moves the pallet 16 under the laser trimming station 510. Another vision camera there (not illustrated) precisely locates the lens 140 relative to the laser beam position and determines a path of movement points for the robot. After each vision system measurement, the robot 12 immediately moves that lens 140 or 141 under the beam of laser 511 acting through the beam deflector 512. The robot 12 then moves the pallet 16 back under the laser station high magnification camera for final inspection.

In addition to the process described immediately above, the robotic cell 10 includes putting a completed good lens into a package that protects it from accumulating dirt in the class 10,000 conditions outside the robotic cell 10. This also assures that the particulate and contamination tests just completed are representative of the product as packaged.

The packaging station is an important illustration of the present invention as it is a preferred embodiment for automatic assembly stations whereby the robot 12 is picking up or removing assemblies from the pallet 16. Under the prior art, such functions are performed with the robot end effector directly picking up the part and moving it. In this embodiment of the present invention, the robot 12 moves the pallet 16 in coordination with a vacuum gripper (not shown) on a pneumatic cylinder at station 514. When the inspection and trimming processes are completed, the robot 12 moves the pallet 16 to the accept station 514. Work-station 513 is a medical grade conveyor moving packages through the packaging process. Work-station 517 feeds such packages onto the conveyor 513. At station 514, acceptable lenses 140 or 141 are individually loaded into open packages. At station 515, a particulate sealing layer is applied to the package, protecting the lens from further contamination. At station 516, the sealed lens package is marked with the bar code and alphanumeric lens identification data by a printer. The package then continues on conveyor 513 out of robotic cell 10 to an accumulation hopper 518.

Referring again to FIG. 1, the robot 12 moves the pallet 16 to the acceptance station 514. A negative pressure picker not shown but similar to tool 149 is on a vertical pneumatic cylinder directly over the lens package (not shown) which is being intermittently conveyed on conveyor 513. The robot 12 moves the pallet 16 up under the vacuum picker. The vacuum is turned on. The robot 12 lowers the pallet 16 and moves it back out of the way of the picker. The picker cylinder then lowers the lens into a single package, releases it with a gentle puff of air, and retracts. The robot then repeats the process for the next lens, and so forth. Referring again to FIG. 13 and knowing that the vertical thickness of the rotatable pallet 16 shown is about ¼ inch, it may be seen that when the vertical distance between the picker tool such as 149 and the top of the package (not shown) is less than 1 inch, the pick and place tool can be simply a tool such as 149 which release the lens as soon as the robot 12 moves the pallet 16 from between the lens 140 or 141 and the package under it. Thus, a mechanically complicated pick and place mechanism according to prior art is replaced by a negative pressure cup or tube with the participation of robot 12 in the station process.

A rejected lens may be discarded at the next station, or may remain in the pallet when it is rejected so that humans can intervene and improve the product.

After removing the acceptable lenses, the robot 12 may move pallet 16 to station 521 where an overhead picker similar to the acceptance station 515 would remove the rejected lens. The robot 12 then moves the completed pallet counterclockwise to the output magazine 522 containing a stack 523 of rotatable pallets in it. The robot 12 moves the pallet 16 under the magazine 30, then up, then causing the pneumatic retaining pins 34 to be withdrawn, moves the pallet 16 up above the retaining pins 34, causes the retaining pins 34 to be reinserted, releases its grip on the pallet 16, and then lowers the robot wrist head 14 down out of the magazine. The inspection processing is then complete.

Continuing to refer to FIG. 1, the robotic work cell 10 includes silicone application work-station 530. Some of the three-piece lenses 140 require a daub of silicone material at the outboard end of the haptics 143. The material is precisely applied in tiny amounts shown as silicone daub 155 in FIG. 11a and then must cure for a number of hours. The material may be applied to the haptics 143 before or after they are insert molded into double convex lens 142.

For this operation, there would be two vertical bored holes (not shown) centered on where the ends of the haptics will be in nest 145. The lenses are loaded into the nests 145 in a pallet designated for that purpose. When the robot 12 receives the pallet 16 from the input magazine 505 and reads its bar code 61, it is commanded to perform the silicone application program. It moves the pallet 16 to the low magnification vision inspection station 506 where it determines and records in its internal nest data table, the orientation of the ends of haptics 143. It then moves to the lens orienter station 509 and rotationally orients all lenses 140 so that the location of the haptic ends is centered in the aforementioned nest bores. It then moves back to station 506 to verify that the haptics are correctly positioned. If one or several are not, then the robot repeats the operations at the lens orienter station 509. With all lens haptics 143 correctly positioned in the nests, the robot 12 moves the pallet 16 to the silicone application station 530. Station 530 is a viscous material syringe fixed in space by a bracket and supplied by a suitable pulsed pressure viscous fluid control unit (not specifically shown). The robot 12 then successively positions each lens 140 for application of silicone daubs 155 to each lens 140. At the completion of said process, the robot 12 moves the pallet 16 back under the high magnification vision camera at station 507 to verify the quantity and quality of each silicone daub 155. If a lens has a defective silicone application, the robot 12 sets the data pin 57 for that nest and, for the first defect on a pallet 16, sets the pallet data pin 58 to the reject position. The robot 12 then moves the pallet 16 to the output pallet magazine and discharges it.

The robot 12 might then also store in its pallet data base the time it completed that rotatable pallet 16 and then automatically rejects said pallet back to the output pallet magazine until the appropriate clock time has passed, or it could set that pallet 16 on a shelf (not identified) within the work cell 10 until sufficient time had passed.

The aforementioned process for application of silicone daubs demonstrates that with the apparatus and methods of the present invention processing stations are inexpensive, small and adaptable to accomplish many different but related tasks depending on the immediate manufacturing needs. Also, use of the nest pin 57 and pallet pin 58 shows how the robotic cell 10 can be integrated with human processes before and after the tasks for robot 12.

An important feature of the present invention is how effectively it can integrate the manufacturing facility information system. For example, in the aforementioned laser trimming station 510, knowing the quantity and location of flash by lens and lens cavity permits the manufacturer to know precisely when and where a specific lens mold (not shown) should be pulled from manufacturing for mold maintenance and implies what work will need to be done to it. This information is being continuously gathered and assessed such that lenses are then not normally begun in molds exhibiting an unsatisfactory but normal progressive deterioration. Further by comparing present and prior results from the same mold when the operations on a specific rotatable pallet 16 are completed, other conditions affecting part quality can be identified at the earliest moment they are manifested in the factory. This rapid information feed-back process is critical to improving work-piece quality and reducing scrap and rework costs in all industrial manufacturing and is the essence of Just In Time manufacturing.

Figure 16:
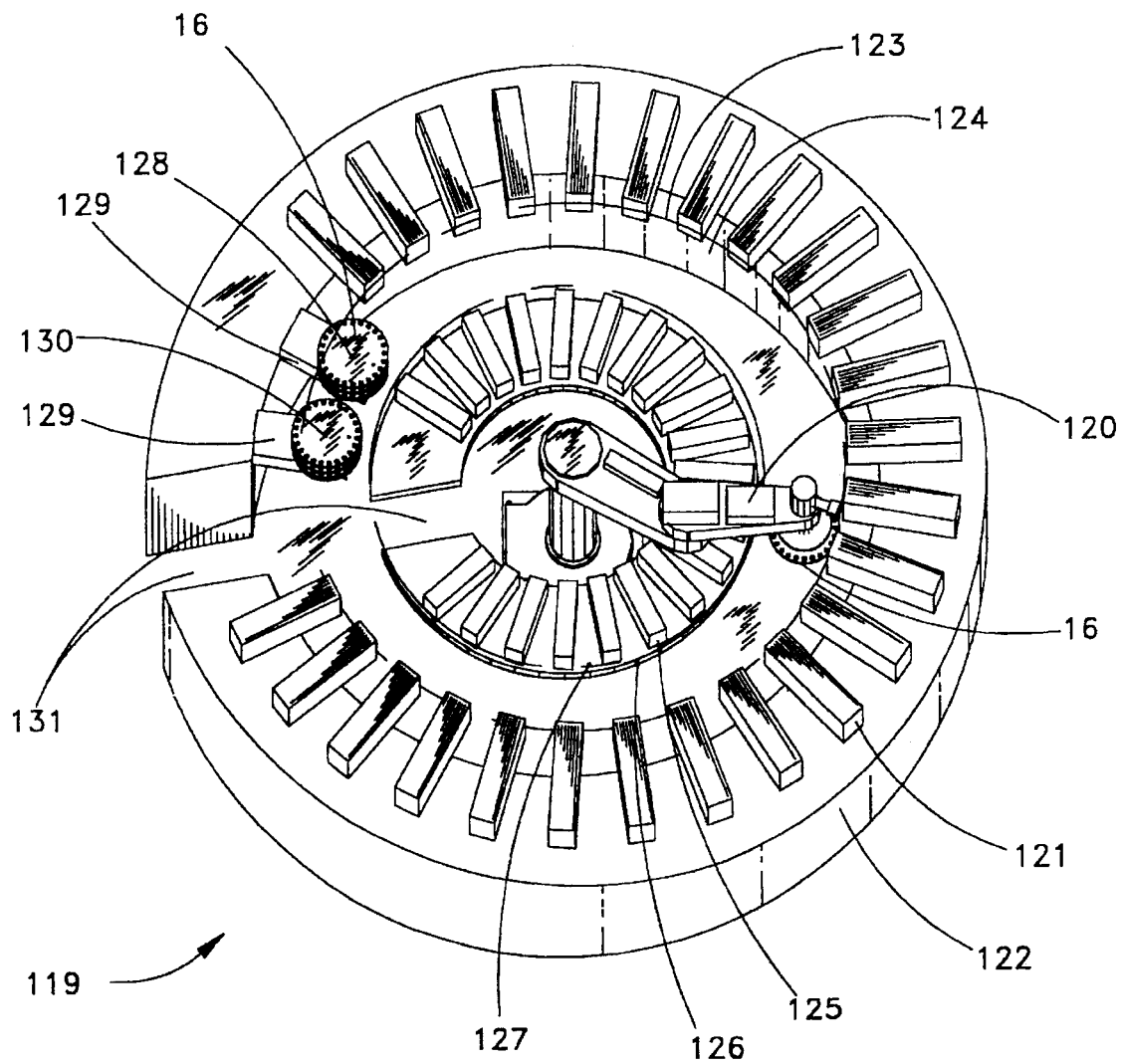
FIG. 16 is a perspective view of a larger robotic work cell having more generic and industrial work-stations using the apparatus and method according to the present invention.

Referring to FIG. 16, there is illustrated a robotic cell 119 with a much larger robot 120 with a much larger array of work-stations 121 but otherwise using the elements and intention of the present invention. This design is suitable for industrial processes where cleanliness is not a manufacturing issue. The distance from the central column to the center of the pallet 16 is approximately forty inches. With the longer (12" versus 4.4") vertical stroke of robot 120, the work-stations 121 can be at multiple vertical levels as indicated by the working envelope lines 123 and 124. The rotatable pallet 16 may be a larger size with the pallet 16 and end effector weighing up to 55 pounds. With the central column design of robot 120, additional work-stations 125 supported by work table 126 can be arranged around the interior of the robot work envelope 127. Passages 131 are provided through the work tables 122 and 126 for maintenance access. Due to the longer vertical stroke of robot 120, the input pallet stack 128 and output pallet stack 130 can simply rest on horizontal supports 129. FIG. 16 thus shows that a very large array of work-stations 121 and 125 around robot 120 are possible. This embodiment is utilized when an extreme variety of processing operations is desired.

Figure 17:
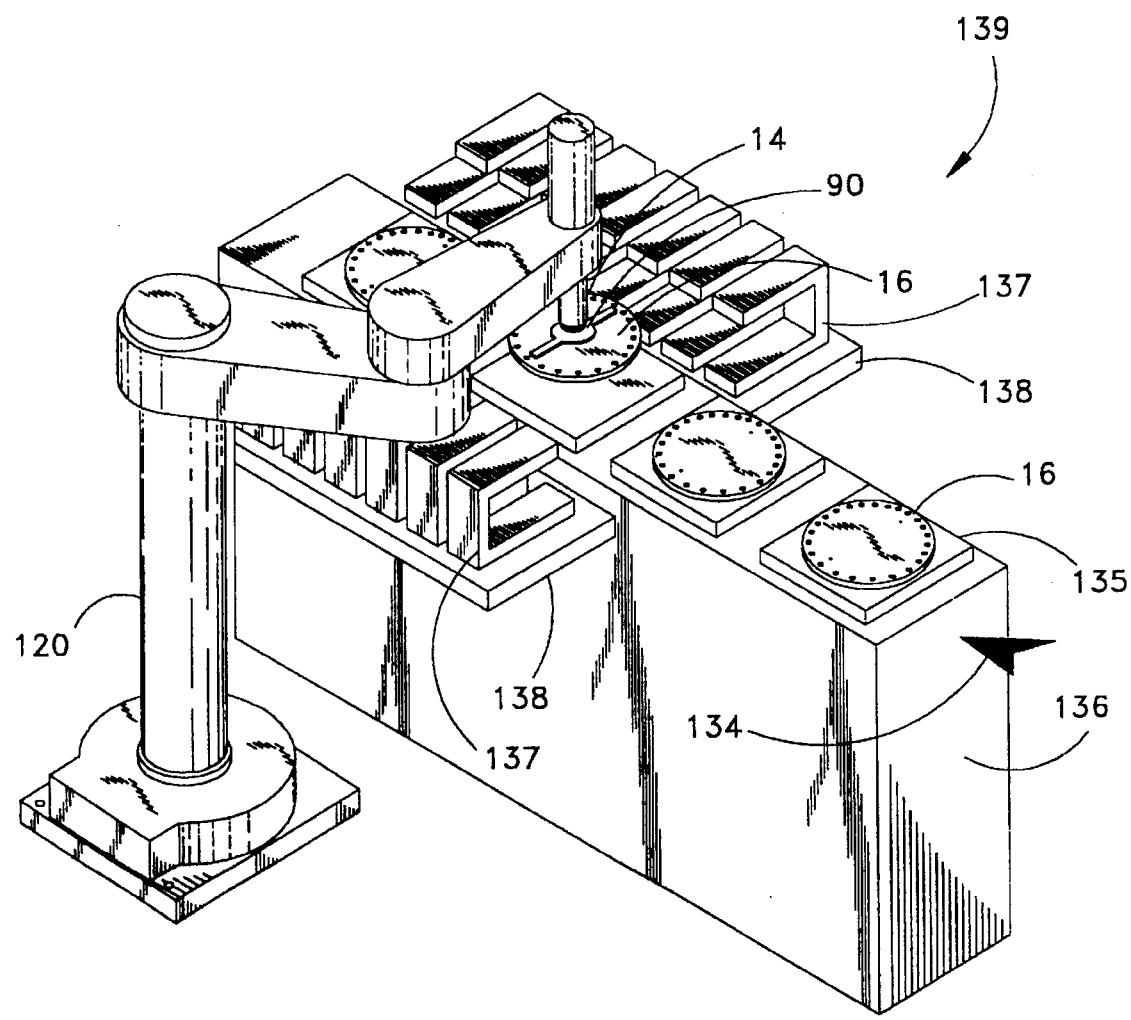
FIG. 17 is a perspective view of a robot positioned on one side of a standard pallet conveyor conveying the rotatable pallets with work-stations arrayed on either side of the line according to the present invention.

Referring to FIG. 17, there is illustrated another important embodiment of the present invention in robotic cell 139. A conveyor 136 conveying in the direction shown by arrow 134 moves rectangular pallets 135 of the prior art along under the operating wrist head 14 of robot 120. Rotatable pallets 16 of the present invention are individually carried on rectangular pallets 135. The rectangular pallet 135 is caused to stop under the robot wrist head 14. Using robot vacuum tool 90, the robot 120 picks up the rotatable pallet 16 from the rectangular pallet 135 and begins processing it under program control through a selected sequence of processes utilizing work-stations 137 arrayed on either side of the conveyor 136 and supported by worktables 138. During such operations, the conveyor 136 may move the then empty rectangular pallet 135 to the next rectangular pallet position still within the working envelope of robot 120. Upon completing the desired processing operations, the robot 120 would deposit the rotatable pallet 16 onto the empty rectangular pallet 135 and immediately move to pick up the next pallet 16 waiting on the next rectangular pallet 135. This embodiment is utilized for increasing the throughput for a lesser number of processing operations, and especially where a series of such robotic cells 139 are arrayed along an inexpensive pallet conveyor 136. It may be observed that robotic cell 139 dramatically reduces the number and complexity of functions previously performed directly from conveyor 136 and the minimum length of conveyor 136. With each rotatable pallet 16 and end effector weighing up to 55 pounds, and the reach of robot 120 extending up to 40" left and right of it along pallet conveyor 136, the productive processing capacity of robotic cell 139 fits within the needs of many industrial production operations. It may be observed that there could be a similar short conveyor line (not shown) behind robot 120 with an entirely different set of work-stations 137 arrayed around it.

Figure 18:
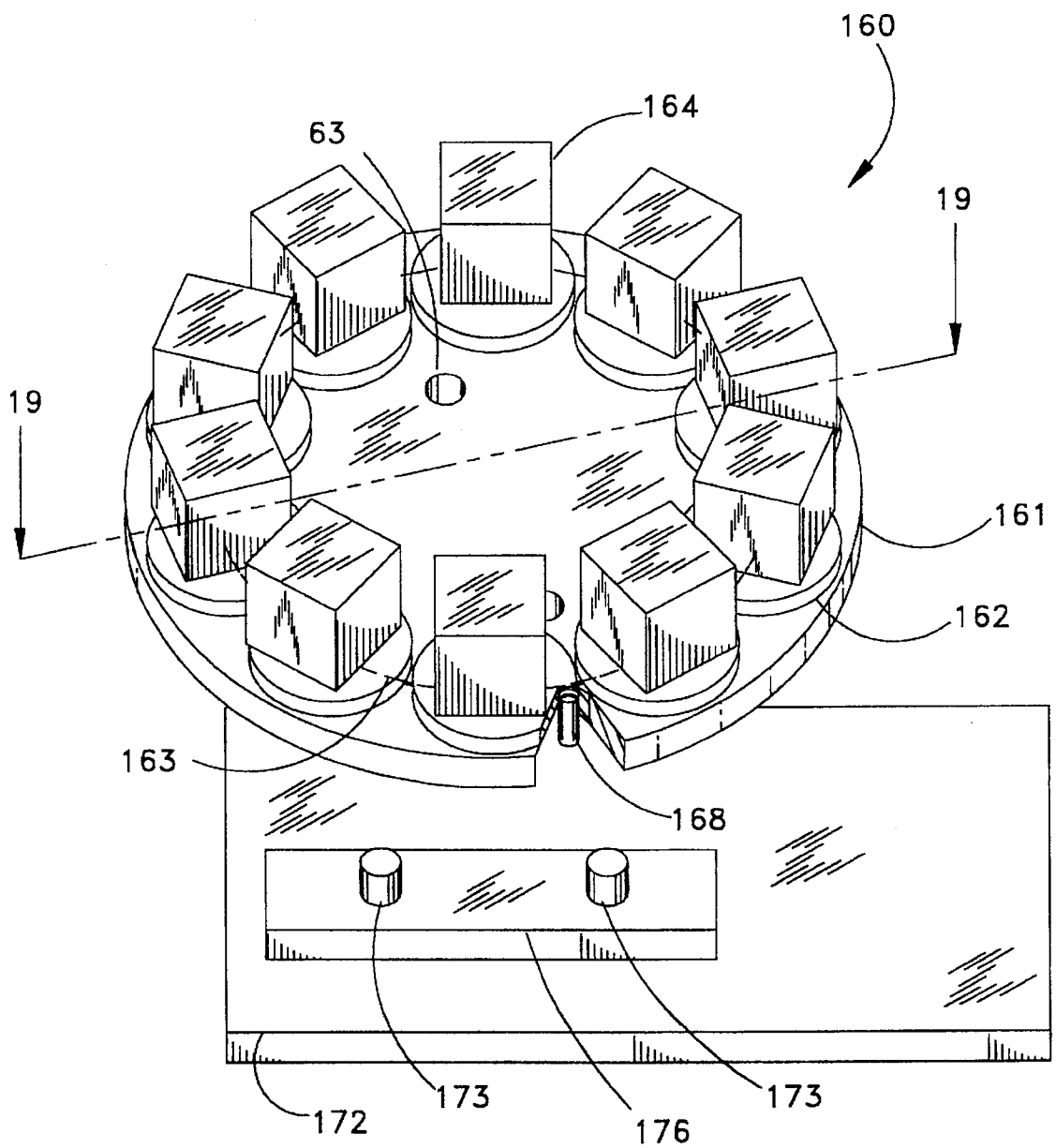
FIG. 18 is a perspective view of a rotatable pallet with rotatable nests for exposing all vertical faces of work-pieces utilizing the robot wrist head to accomplish the repositioning in one rapid operation.
Figure 19:
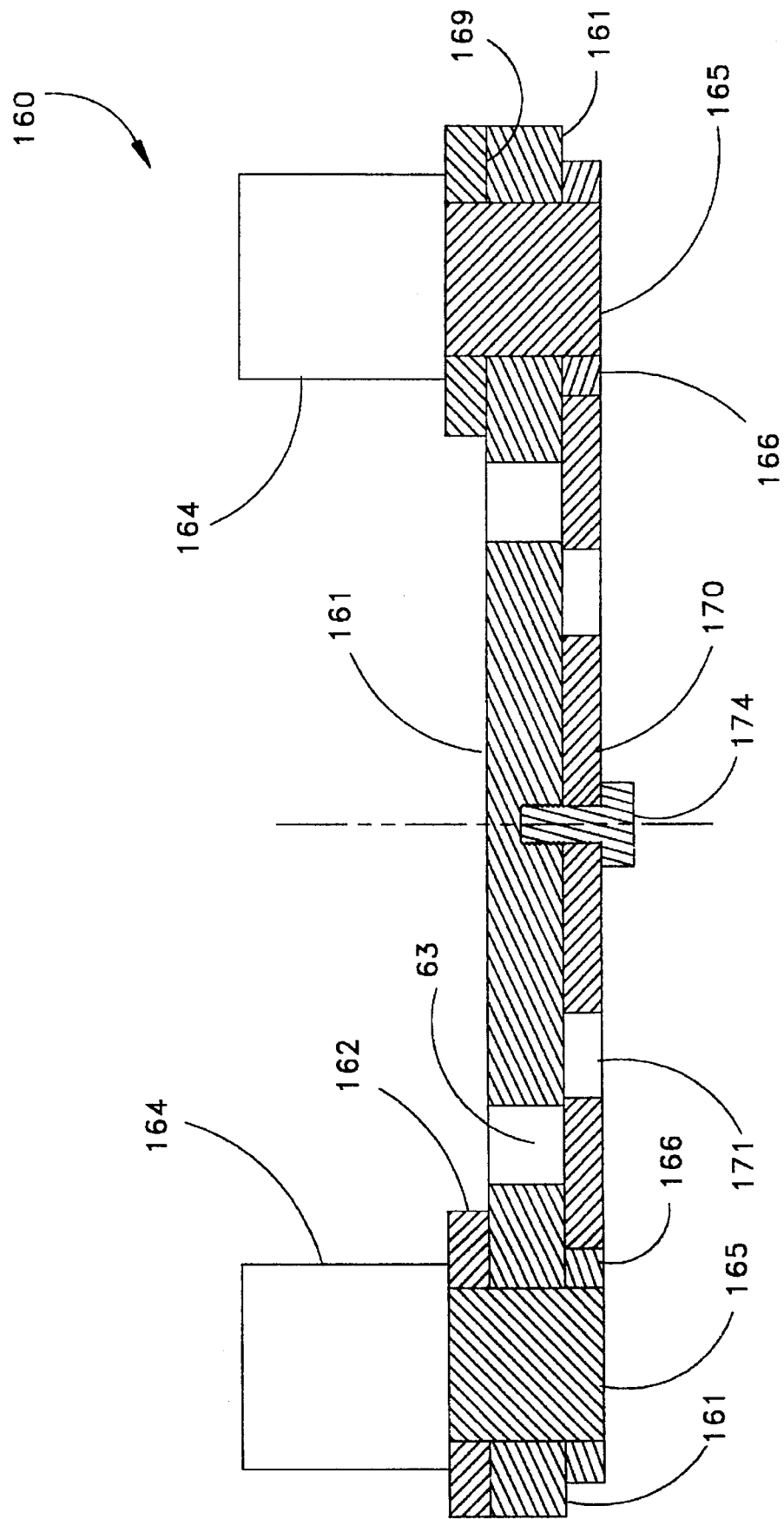
FIG. 19 is a section view of the rotatable pallet with rotatable nests of FIG. 18 showing the components not easily visible in FIG. 18.

Referring to FIGS. 18 and 19, there is illustrated another important embodiment of the present invention, a rotatable pallet 160 with rotatable work-piece nests. As the small parts for processing becoming larger and the operations more complex, it becomes necessary to enable rapidly adjusting which work-piece faces are closest to the periphery of the rotatable pallet. This embodiment also shows a way of including the capabilities of robot 120 to simplify the work-station mechanisms. The central disk 161 of rotatable pallet 160 has nests 162 arrayed around it on a circular centerline 163. A work-piece 164 rests on and is held by features (not shown) of nest 162 which rotates on shaft 165 with a spur gear 166 affixed to the bottom of shaft 165. The nests are temporarily held in correct rotational alignment by a ball and spring detent holding assembly 168 acting on a series of depressions 169 under the nest 162. Affixed centrally to the bottom of the pallet central disk 161 by shoulder bolt 174, or similar fastener, is a larger diameter pallet spur gear 170 in mesh with the teeth of the nest spur gears 166 under each nest 162. The pallet spur gear 170 includes at least one indexing feature shown here as holes 171 near its periphery. When robot 120 needs to rotate all the vertical faces of work-pieces 164, it moves the rotatable pallet 160 to work-station 172 which includes pallet rotation pins 173 affixed to a bar 176 on the lower surface of work-station 172. The robot 120 then moves the rotatable pallet 160 over and down onto pin 173 where pin 173 then protrudes into the indexing feature hole 171. The wrist of robot 12 then rotates the rotatable pallet 160. Since the pallet spur gear 170 is then held by the pin 173 acting on hole 171 and the nest spur gears 166 are in mesh and rotating about shafts 165 in pallet disk 161, the nests 162 are all simultaneously caused to rotate proportionate to the wrist rotation of robot 12. Depressions 169 and the action of balls 168 maintain the rotational positions of rotatable nests 162 between adjustments by robot 12. Work-stations 172 with pins 173 can be conveniently located in a plurality of locations around the working envelope of robot 12 for repeated rapid repositioning of work-pieces 164 as desired without having to return to a specific work-station 172. Such repositioning can be to any angle desired such as for processing on non-orthogonal features of work-pieces 164. If the bar 176 is caused to rotate by means not shown and while rotatable pallet 160 is held in place by robot 12, then the nests 162 would all rotate on shafts 165. Such method would be useful for certain kinds of simultaneous processing of work-pieces 164 for which more than a few rotations is desired. Also observing that if the pallet spur gear 170 were omitted, then the nest spur gears 166 could be individually rotated by rotating the nest spur gears 166 at suitable work-stations.

A suitable robot for use in conjunction with the inventive apparatus is available from a number of manufacturers, some of which have robot wrists that can easily be inverted 180 degrees from their normal orientation. Those robots can also be utilized for normal industrial processing in which the rotatable pallet is located beneath the rotating wrist. The faster and more precise a robot can move its wrist, the more desirable its use in the system. An acceptable robot is capable of payload movement speeds of at least 1 foot per second, a wrist capable of rapid rotation for 360 degrees of rotation, and is rated to carry a payload on the wrist of at least 5 pounds. Such robots are commonly available.

Although of more limited utility due to much smaller working envelope, crossed slide linear robots moving heads in the X, Y and Z directions with rotation of a wrist joint and carrying a rotatable pallet are within the intended scope of the present invent/on. For example, the Seiko XM 5106 cartesian robot is repeatable to 0.0003" in the X and Y directions and 0.00015" in the Z direction and has rotating wrist resolving to 0.0023 degrees per pulse. For applications needing extreme precision said robot can be competitive when the pallet is carried over the wrist and the robot is positioned below the main work-station levels. In ceils with only a few functions necessary, such as in the intraocular lens application, such a more limited robot could be satisfactory.

According to the present invention, the robot wrist 14 performs most of the actual indexing motion, rotating rotatable pallet 16 from one sector to another, and then stopping only long enough for the work-station to perform its designated task. This utilization of the wrist motion instead of moving the entire robot arm from one work-station to another for each separate part, minimizes wear on parts other than the wrist, and minimizes the distance that the robot arm must move during operations. In fact, the robot arm itself often does not have to move at all, until all work-pieces have been processed at a work-station. This naturally minimizes the distance the robot arm moves in performing operations on a given number of parts, thereby dramatically increasing productivity and reliability.

Individual work-stations designed for utilizing the present invention need not be sophisticated and do not need to include position adjustments because the robot presents each part to the exact location in X and Y and Z space needed to perform the work on it.

A subtle but economically important feature of the present invention is that there is generally only one active process going on at one moment in the robotic ceil. Costly electronic control resources such as machine vision systems and laser distance ranging devices can be shared among multiple operations for the cost of the sensor (and lenses for video cameras). Further, when such resources are not needed for a significant part of the processing time, they can be multiplexed among several such robotic cells or other processing stations. Even expensive resources such as the aforementioned laser trimming station can be shared by making such a station common to the work envelopes of several adjoining robots or by temporarily moving the expensive laser to another robotic cell. Thus, the economics of using robotic cells of the present invention are increasingly attractive as the processing stations get more and more expensive.

Conventional robot systems include at least the following elements: (1) the robot; (2) an end effector; (3) a way to get work in front of the robot, which is generally a pallet system; and (4) a work-station support base.

The present invention can replace or minimize many of the small part pallet systems of the conventional art wherein a succession of much more limited capability robotic cells are arrayed along a long rectangular pallet conveyor. Many work-pieces not built in sufficiently identical configurations and in sufficient volumes to justify integrated robotic or human assembly lines will be economical to produce in robotic cells of the present invention.

It is essential to the embodiment of the invention described herein that the robot be capable of holding a rotatable pallet 16 and rotating it through a primarily circular motion about the center of the rotatable pallet 16. For clean room processing it is desirable, but not essential, that the robot wrist head 14 be capable of being positioned below the rotatable pallet 16, thereby permitting operations to be carried out on parts located on the upper surface of the rotatable pallet 16.

Defined broadly, the present invention is an apparatus for assembly and processing work-pieces comprising: (a) a robot having a head and capable of controlled X, Y, and Z movements, the robot head further having a wrist joint capable of rotation in the horizontal plane; (b) a rotatable pallet for retaining said work-pieces having a plurality of work-piece nests for retaining said work-pieces; (c) means for attaching said pallet to said robot head; and (d) a plurality of work-stations located within a work envelope of said robot for performing a plurality of different operations on said work-pieces which are transported by said robot.

The invention is also alternatively defined as an apparatus comprising: (a) a vertical magazine for retaining at least one of a stack of rotatable pallets and elevated on a support bracket so that a robot head on a robot with a rotatable pallet above said robot head can be moved under said magazine; (b) said magazine further comprising a plurality of movable pins disposed about a circumference of a cylindrical body adjacent to a bottom opening of said cylindrical body and projecting inwardly to prevent a bottom pallet in said stack of rotatable pallets from passing down through said cylindrical body until retracted; (c) said magazine further comprising a plurality of vertical guide blocks for X and Y direction location of said pallets in said magazine; and (d) said magazine located within an operating envelope of said robot head.

The invention is also alternatively defined as a rotatable pallet for retaining a plurality of work-pieces and to be used in conjunction with an automated robot assembly apparatus, the rotatable pallet comprising: (a) a disk have a plurality of nests for retaining said plurality of work-pieces; (b) stacking pins mating to depending surfaces in similar said pins in stacks of said pallets; (c) movable pins for nest conditions; and (d) means for attachment to said robot.

The invention is also alternatively defined as a rotatable pallet for retaining a plurality of work-pieces and to be used in conjunction with an automated robot assembly apparatus, the rotatable pallet comprising: (a) a disk have a plurality of nests for retaining said plurality of work-pieces; (b) a hole in said pallet for insertion of a dowel pin affixed to an end effector on said robot; and (c) a plurality of movable pins for conditions of said nests.

The invention is also alternatively defined as a rotatable pallet for retaining a plurality of work-pieces and to be used in conjunction with an automated robot assembly apparatus, the rotatable pallet comprising: (a) a disk have a plurality of nests for retaining said plurality of work-pieces, the disk further having a central cavity; (b) a centrally disposed annular ring affixed to said rotatable pallet; (c) said pallet central cavity and said central cavity in said ring are of the same size and coaxial; and (d) a dowel pin hole in said ring and a coaxial dowel pin hole in said pallet.

The invention is also alternatively defined as an apparatus comprising: (a) a robot with a negative pressure source, a central negative pressure port on a head of said robot; and (b) a robot end effector comprising a body with a central cavity, a flexible seal, a flexible seal seat, and a protruding dowel pin mating to a similarly disposed hole in a rotatable pallet.

The invention is also alternatively defined as an apparatus comprising: (a) a robot; (b) a robot end effector for temporarily gripping a rotatable pallet; (c) said robot end effector further comprising an end effector body, a dowel pin mating to a depending hole in said pallet, an eccentric cam extending through a depending hole in said pallet, an arm with a ball joint on said eccentric cam, a pneumatic cylinder affixed on one end to said end effector body with the other end acting on said arm ball joint causing said eccentric cam to rotate, and an inclined surface on said cam adjacent to a further surface of said pallet; and (d) means for clamping said pallet to said robot end effector by rotation of said cam acting on said further surface of said pallet.

The invention is also alternatively defined as an apparatus comprising: (a) a vertical magazine for retaining at least one of a stack of rotatable pallets and elevated on a support bracket so that a robot head on a robot with a rotatable pallet above said robot head can be moved under said magazine; (b) said magazine further comprising a plurality of movable pins disposed about a circumference of a cylindrical body adjacent to a bottom opening of said cylindrical body and projecting inwardly to prevent a bottom pallet in said stack of rotatable pallets from passing down through said cylindrical body until retracted; (c) said magazine further comprising a plurality of vertical guide blocks for X and Y direction location of said pallets in said magazine; and (d) said magazine located within an operating envelope of said robot head.

Defined alternatively, a principal base claim of the present invention is a method for performing processing operations on work-pieces utilizing a robot capable of moving its head in the X, Y, and Z directions with a wrist joint rotatable in the horizontal plane, the method comprising the steps of: (a) utilizing a rotatable pallet which has a plurality of nests for retaining a plurality of work pieces; (b) mounting a pallet-gripping end effector on said robot head; (c) grasping said rotatable pallet with said robot end effector; (d) presenting a work-piece in said pallet to a processing work-station in a working envelope of said robot; (e) performing a work-station task on said presented work-piece; (f) indexing said pallet to present another work-piece to said work-station by rotating said wrist of said robot; (g) performing a work-station task on said other work-piece; and (h) repeating steps "f" and "g" sequentially until all said work-pieces in said pallet have been worked on at said work-station.

The invention is also further defined as the limitations of the principal based claim including the following: (a) utilizing a part gripper not moving with said robot end effector; (b) gripping a component for said work-piece from a supply point; (c) moving said pallet by said robot relative to said work-piece to position said component for assembly; (d) moving said pallet by said robot to complete said assembly of said component to said work-piece; and (e) releasing said gripping of said component.

The invention is also further defined as the limitations of the principal based claim including the following: (a) utilizing a part gripper not moving with said robot end effector; (b) moving said pallet by said robot to a part gripping position for a selected work-piece on said pallet; (c) gripping said selected work-piece on said pallet; (d) moving said pallet by said robot relative to said work-piece to a position away from said selected work-piece; and (e) releasing said gripping of said selected work-piece.

The invention is also further defined as the limitations of the principal based claim including the following: (a) utilizing a part gripper not moving with said robot end effector; (b) moving said pallet by said robot to a part gripping position for a selected work-piece on said pallet; (c) gripping said selected work-piece on said pallet; (d) moving said pallet by said robot relative to said work-piece to a position away from said selected work-piece; (e) performing a work-station processing action on said selected work-piece; (f) moving said pallet by said robot to position said work-piece back in said pallet; and (g) releasing said gripping of said selected work-piece.

The invention is also further defined as the limitations of the principal based claim including the following: (a) utilizing a part gripper not moving with said robot end effector; (b) moving said pallet by said robot to a part gripping position for a selected work-piece on said pallet; (c) gripping said selected work-piece on said pallet; (d) moving said pallet by said robot relative to said work-piece to a position away from said selected work-piece; (e) reorienting said selected work-piece by said part gripper; (f) moving said pallet by said robot to a position where said work-piece is back in said pallet; and (g) releasing said gripping of said selected work-piece.

The invention is also further defined as the limitations of the principal based claim including the following: (a) utilizing said robot end effector under said rotatable pallet; (b) utilizing a pallet magazine for stacking said pallets; (c) moving said robot head up against the lowest said pallet in a vertical stack of said pallets; (d) moving said robot head further up; (e) ripping said lowest pallet with said robot end effector; (f) withdrawing a movable supporting devices of said magazine from below said lowest pallet; (g) moving said robot head and said stack of pallets down; (h) inserting said movable supporting devices above said lowest pallet in said stack of said pallets and below pallet above said lowest pallet in said stack; (i) moving said robot head and said lowest pallet further down releasing said lowest pallet from said pallets above it in said stack of pallets; and (j) moving said robot head and said pallet away from under said magazine.

The invention is also further defined as the limitations of the principal based claim including the following: (a) utilizing said robot end effector under said pallet; (b) utilizing a pallet magazine for stacking said pallets; (c) gripping said selected pallet with said robot end effector; (d) moving said robot end effector with selected pallet up against the lowest said pallet in said vertical stack of said pallets; (e) moving said robot head further up; (f) withdrawing a movable supporting devices of said magazine from below said lowest pallet; (g) moving said robot head and said stack of pallets down; (h) inserting said movable supporting devices above said lowest pallet in said stack of said pallets and below pallet above said lowest pallet in said stack; (i) moving said robot head and said lowest pallet further down releasing said lowest pallet from said pallets above it in said stack of pallets; and (j) moving said robot head and said pallet away from under said magazine.

The invention is also further defined as the limitations of the principal based claim including the following: (a) utilizing a robot end effector; (b) utilizing an indexing conveyor to move a conveyor pallet; (c) supporting said rotatable pallet on said conveyor pallet; (d) aligning said robot end effector into said rotatable pallet; (e) gripping said rotatable pallet with said robot end effector; (f) moving said rotatable pallet through a plurality of work-stations performing selected operations on said work-pieces in said nests; (g) aligning said robot end effector with said rotatable pallet to said conveyor pallet; (h) releasing said robot end effector's grip on said rotatable pallet; (i) moving said robot end effector away from said rotatable pallet; and (j) utilizing said indexing conveyor to move said conveyor pallet out of said working envelope of said robot.

The invention is also further defined as the limitations of the principal based claim including the following: (a) utilizing a pallet storage station in the work envelope of said robot; (b) utilizing another robot with a work envelope including said pallet storage station within its work envelope; and (c) placing said rotatable pallets into said storage station with electronic commands to said second robot that said pallets are to be picked up by second said robot.

The invention is also further defined as the limitations of the principal based claim including the following: (a) utilizing said rotatable pallet; (b) utilizing a bar code on said pallet; (c) utilizing a bar code reader at a work-station; (d) utilizing a factory computer data base system; and (e) associating an identity and a condition with an identity of said specific work-pieces in said nests in said rotatable pallet.

The invention is also alternatively defined as a method for performing processing operations on work-pieces utilizing a robot capable of moving its head in the X, Y, and Z directions with a wrist joint rotatable in the horizontal plane, the method comprising the steps of: (a) utilizing a rotatable pallet having a plurality of nests and with a pallet identity given by a bar code affixed to a surface of said rotatable pallet; (b) utilizing movable data pins in said rotatable pallet to indicate the condition of said work-pieces in said rotatable pallet; (c) mounting a pallet-gripping end effector over said robot head; (d) grasping said rotatable pallet with a robot end effector; (e) presenting a work-piece in said pallet to a processing work-station in a working envelope of said robot; (f) performing a work-station task on said presented work-piece; (g) indexing said pallet to present another work-piece to said work-station by rotating said wrist of said robot; (h) performing a work-station task on said other work-piece; (i) repeating steps (g) and (h) sequentially until all said work-pieces in said pallet have been worked on at said work-station; and (j) repeating steps (e) through (i) for a plurality of said work-stations in said working envelope of said robot.

The invention is also alternatively defined as a method for performing processing operations on work-pieces utilizing a robot capable of moving its head in the X, Y, and Z directions with a wrist joint rotatable in the horizontal plane, the method comprising the steps of: (a) utilizing a rotatable pallet having a plurality of nests and with a pallet identity given by a bar code affixed to a surface of said rotatable pallet; (b) utilizing movable data pins in said rotatable pallet to indicate the condition of said work-pieces in said rotatable pallet; (c) mounting a pallet-gripping end effector under said robot head; (d) grasping said rotatable pallet with a robot end effector; (e) presenting a work-piece in said pallet to a processing work-station in a working envelope of said robot; (f) performing a work-station task on said presented work-piece; (g) indexing said pallet to present another work-piece to said work-station by rotating said wrist of said robot; (h) performing a work-station task on said other work-piece; (i) repeating steps (g) and (h) sequentially until all said work-pieces in said pallet have been worked on at said work-station; and (j) repeating steps (e) through (i) for a plurality of said work-stations in said working envelope of said robot.

The invention is also alternatively defined as a method for simplifying work-station mechanisms in a robot work cell, comprising the steps of: (a) utilizing said robot with a wrist joint rotatable in a horizontal plane; (b) utilizing a pallet gripping robot end effector; (c) utilizing a circular pallet containing a plurality of work-pieces in a plurality of nests disposed in a circular array around said pallet; (d) utilizing a bar code on said circular pallet to identify it and the work-pieces in said work-piece nests; (e) utilizing a plurality of processing work-stations disposed around a work envelope of said robot; (f) utilizing said end effector to grip said circular pallet; (g) selecting a sequence of operations to be performed on selected work-pieces; (h) moving said circular pallet among selected said work-stations; (i) at each said selected said work-station, processing selected said work-pieces; (j) indexing between selected work-pieces at said selected work-stations solely by rotating said circular pallet by rotating the robot end effector; (k) utilizing said robot to move said robot end effector as part of some of said operations; (l) repeating steps (h) through (k) for all selected work-stations and all selected work-pieces; and (m) repeating steps (f) through (l) for a plurality of said circular pallets.

The invention is also alternatively defined as a method for simplifying work-station mechanisms in a robot work cell, comprising the steps of: (a) utilizing said robot with a wrist joint rotatable in a horizontal plane; (b) utilizing a pallet gripping robot end effector; (c) utilizing a circular pallet containing a plurality of work-pieces in a plurality of nests disposed in a circular array around said pallet; (d) utilizing a bar code on said circular pallet to identify it and the work-pieces in said work-piece nests; (e) utilizing a plurality of processing work-stations disposed within a work envelope of said robot; (f) utilizing said end effector to grip said circular pallet; (g) selecting a sequence of operations to be performed on selected work-pieces; (h) moving said circular pallet among selected said work-stations; (i) at each said selected said work-station, processing selected said work-pieces; (j) indexing between selected work-pieces at said selected work-stations solely by rotating said circular pallet by rotating the robot end effector; (k) utilizing said robot to move said circular pallet as part of one said operation to install said work-pieces into said nests; (l) utilizing said robot to move said circular pallet as part of one said operation to remove said work-pieces from said nests; and (m) repeating steps (h) through (l) for all selected work-stations and all selected work-pieces.

Of course the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus shown is intended only for illustration and for disclosure of an operative embodiment and not to show all of the various forms or modification in which the present invention might be embodied or operated.

The present invention has been described in considerable detail in order to comply with the patent laws by providing full public disclosure of at least one of its forms. However, such detailed description is not intended in any way to limit the broad features or principles of the present invention, or the scope of patent monopoly to be granted.

What is claimed is:

1. A method for performing work-station processes in a robot work cell, the work cell comprising a plurality of processing work-stations disposed within a work envelope of a robot, the method comprising the steps of:
   a. providing said robot with a wrist joint rotatable in a horizontal plane and a pallet gripping robot end effector mounted to said wrist joint;
   b. providing a circular pallet containing a plurality of work-pieces in a plurality of nests disposed in a circular array around said pallet, said pallet including a bar code thereon to identify said pallet and the work-pieces in said work-piece nests;
   c. gripping said circular pallet with said end effector;
   d. selecting a sequence of operations to be performed on selected work-pieces within said circular pallet;
   e. moving said circular pallet among selected work-stations based on said selected sequence of operations;
   f. at each selected work-station, performing an operation on said selected said work-pieces;
   g. indexing between selected work-pieces at said selected work-stations primarily by rotating and moving said circular pallet through rotation and horizontal motion of the robot end effector; and
   h. repeating steps (d) through (g) for all selected work-stations and all selected work-pieces.

2. A method in accordance with claim 1 further comprising the steps of:
   a. removing a work-piece from a work-piece nest of said circular pallet;
   b. reorienting said work-piece by means not attached to said robot end effector; and
   c. replacing said work-piece back into said work-piece nest.

3. A method in accordance with claim 1 further comprising the steps of:
   a. removing a work-piece from a work-piece nest of said circular pallet; and
   b. placing said work-piece into a different work-piece nest.

4. A method in accordance with claim 1 further comprising the steps of:
   a. providing a bar code reader at one of said selected work stations, said bar code reader being in communication with a factory computer data base system; and
   b. reading said bar code with said bar code reader when said circular pallet is moved to said selected work-station to thereby associate the identity and condition of said work-pieces in said nests in said circular pallet with corresponding identities and conditions in said data base system.

5. A method for performing work-station processes in a robot work cell, the work cell comprising a plurality of processing work-stations disposed within a work envelope of a robot, the method comprising the steps of:
   a. providing said robot with a wrist joint rotatable in a horizontal plane and a pallet gripping robot end effector mounted to said wrist joint;
   b. providing a rotatable pallet containing a plurality of work-pieces in a plurality of nests disposed in an array around said pallet, said pallet including an identifying means thereon to identify said pallet and the work-pieces in said work-piece nests;
   c. gripping said rotatable pallet with said end effector;
   d. selecting a sequence of operations to be performed on selected work-pieces within said rotatable pallet;
   e. moving said rotatable pallet among selected work-stations based on said selected sequence of operations;
   f. at each selected work-station, performing an operation on said selected said work-pieces;
   g. indexing between selected work-pieces at said selected work-stations primarily by rotating and moving said rotatable pallet through rotation and horizontal motion of the robot end effector; and
   h. repeating steps (d) through (g) for all selected work-stations and all selected work-pieces.

6. A method in accordance with claim 5 further comprising the steps of:
   a. removing a work-piece from a work-piece nest of said rotatable pallet;
   b. reorienting said work-piece by means not attached to said robot end effector; and
   c. replacing said work-piece back into said work-piece nest.

7. A method in accordance with claim 5 further comprising the steps of:
   a. removing a work-piece from a work-piece nest of said rotatable pallet; and
   b. placing said work-piece into a different work-piece nest.

8. A method in accordance with claim 5 further comprising the steps of:
   a. providing an identifying reader means at one of said selected work stations, the identifying reader means being in communication with a factory computer data base system; and
   b. reading said identifying means with said identifying reader means when said rotatable pallet is moved to said selected work-station to thereby associate the identity and condition of said work-pieces in said nests in said rotatable pallet with corresponding identities and conditions in said data base system.

9. A method in accordance with claim 5 wherein said rotatable pallet is rectangular.

10. A method in accordance with claim 5 wherein said rotatable pallet is non-circular.

* * * * *